(12) United States Patent
Yu et al.

(10) Patent No.: US 12,120,650 B2
(45) Date of Patent: Oct. 15, 2024

(54) DATA TRANSMISSION METHOD AND RELATED APPARATUS

(71) Applicant: HUAWEI TECHNOLOGIES CO., LTD., Guangdong (CN)

(72) Inventors: Jian Yu, Shenzhen (CN); Yunbo Li, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 696 days.

(21) Appl. No.: 17/144,844

(22) Filed: Jan. 8, 2021

(65) Prior Publication Data

US 2021/0136764 A1    May 6, 2021

Related U.S. Application Data

(63) Continuation of application No. PCT/CN2019/081551, filed on Apr. 4, 2019.

(30) Foreign Application Priority Data

Jul. 11, 2018    (CN) .......................... 201810758519.4

(51) Int. Cl.
*H04W 72/0453*    (2023.01)
*H04W 56/00*    (2009.01)

(52) U.S. Cl.
CPC ....... *H04W 72/0453* (2013.01); *H04W 56/00* (2013.01)

(58) Field of Classification Search
CPC . H04W 72/0453; H04W 56/00; H04W 28/18; H04W 8/24; H04W 84/12; H04W 36/22; H04W 24/02; H04W 88/06; H04L 5/0023; H04L 5/0048; H04L 1/0002; H04L 5/0044; H04L 5/0053; H04L 5/0055;
(Continued)

(56) References Cited

U.S. PATENT DOCUMENTS

| 6,968,568 | B1 | 11/2005 | Hilpert, Jr. |
| 9,455,927 | B1 | 9/2016 | Nayak et al. |
| 10,306,603 | B1 * | 5/2019 | Chu .......................... H04L 47/31 |

(Continued)

FOREIGN PATENT DOCUMENTS

| CN | 1981485 A | 6/2007 |
| CN | 101720113 A | 6/2010 |

(Continued)

OTHER PUBLICATIONS

Office Action issued in Japanese Application No. 2021-500544 on Feb. 1, 2022, 8 pages (with English translation).
(Continued)

*Primary Examiner* — Thai Nguyen
(74) *Attorney, Agent, or Firm* — Fish & Richardson P.C.

(57) ABSTRACT

The present disclosure relates to data transmission methods and related apparatus. In one example method, a first node sends a to-be-sent frame whose classification attribute value belongs to the first frequency block classification range to a second node by using a first frequency block. The classification attribute value of the to-be-sent frame includes at least one of a frame type, a transmission rate, quality of service, a quality of service access category, a spatial stream, sending duration, a data packet format, or a data packet bandwidth.

20 Claims, 10 Drawing Sheets

(58) Field of Classification Search
CPC ..... H04L 5/0058; H04L 47/20; H04L 1/0083; H04L 47/2441; H04L 47/29; H04L 5/0094
See application file for complete search history.

(56) References Cited

U.S. PATENT DOCUMENTS

| | | | |
|---|---|---|---|
| 2003/0120742 A1* | 6/2003 | Ohgami | H04N 21/44231 375/E7.025 |
| 2004/0213144 A1* | 10/2004 | Murakami | H04L 27/2601 370/208 |
| 2005/0227702 A1* | 10/2005 | Nishimura | H04W 72/541 455/454 |
| 2006/0002488 A1 | 1/2006 | Asanuma | |
| 2009/0310692 A1 | 12/2009 | Kafle et al. | |
| 2011/0065440 A1 | 3/2011 | Kakani | |
| 2015/0103663 A1 | 4/2015 | Amini et al. | |
| 2017/0311325 A1 | 10/2017 | Cariou et al. | |
| 2018/0054724 A1* | 2/2018 | Cariou | H04W 8/005 |
| 2018/0054847 A1 | 2/2018 | Cariou et al. | |
| 2019/0261243 A1* | 8/2019 | Amini | H04N 21/43637 |
| 2020/0235874 A1* | 7/2020 | Yeo | H04W 72/04 |

FOREIGN PATENT DOCUMENTS

| | | | | |
|---|---|---|---|---|
| CN | 102548003 | A | 7/2012 | |
| CN | 104601481 | A | 5/2015 | |
| CN | 104955102 | A | 9/2015 | |
| CN | 105682163 | A | 6/2016 | |
| CN | 106922029 | A | 7/2017 | |
| CN | 106937395 | A | 7/2017 | |
| EP | 2785136 | A1 * | 10/2014 | .......... H04L 47/122 |
| JP | H10150386 | A | 6/1998 | |
| JP | 2001237830 | A | 8/2001 | |
| JP | 2014017885 | A | 1/2014 | |
| JP | 2015528660 | A | 9/2015 | |
| WO | 2014103363 | A1 | 7/2014 | |
| WO | 2017009209 | A1 | 1/2017 | |
| WO | 2017117286 | A1 | 7/2017 | |

OTHER PUBLICATIONS

Extended European Search Report issued in European Application No. 19833247.0 on Jul. 5, 2021, 9 pages.
Office Action issued in Chinese Application No. 202210103192.3 on Aug. 1, 2022, 7 pages.
PCT International Search Report and Written Opinion issued in International Application No. PCT/CN2019/081551 on Jun. 24, 2019, 17 pages (with English translation).
IEEE P802.11ax™/D1.3, "Draft Standard for Information technology—Telecommunications and information exchange between systems Local and metropolitan area networks—Specific requirements; Part 11: Wireless LAN Medium Access Control (MAC) and Physical Layer (PHY) Specifications; Amendment 6: Enhancements for High Efficiency WLAN," Jun. 2017, 522 pages.
Cariou, "CR for 6GHz," IEEE 802.11-18/1229r1, Jul. 9, 2018, 7 pages.
Chu et al., "FST issues (comment 3026)," IEEE 802.11-11/0857r0, Jun. 7, 2011, 12 pages.
Office Action in Japanese Appln. No. 2022-196338, mailed on Nov. 21, 2023, 10 pages (with English translation).

* cited by examiner

DATA TRANSMISSION METHOD AND RELATED APPARATUS

CROSS-REFERENCE TO RELATED APPLICATIONS

This application is a continuation of International Application No. PCT/CN2019/081551, filed on Apr. 4, 2019, which claims priority to Chinese Patent Application No. 201810758519.4, filed on Jul. 11, 2018. The disclosures of the aforementioned applications are hereby incorporated by reference in their entireties.

TECHNICAL FIELD

This application relates to the field of communications technologies, and in particular, to a data transmission method and a related apparatus.

BACKGROUND

With the rapid development of wireless communications technologies and the popularization of mobile terminals, various information searching and information exchange manners based on wireless communication are increasingly widely used in daily life.

In the field of wireless communication, a communications device may be referred to as a node. When data is transmitted between nodes in a wireless manner, the nodes need to use some wireless transmission resources. For example, a first node transmits data to a second node, and the first node may transmit the data to the second node by using a radio transmission resource in a frequency block on which the first node negotiates with the second node.

Currently, in a process of data transmission between nodes, a throughput rate of a frequency block is relatively low, and an overall latency level of the frequency block is relatively high. Consequently, satisfaction of an upper-layer service requirement is low.

SUMMARY

This application provides a data transmission method and a related apparatus, to improve satisfaction of a service requirement.

According to a first aspect, an embodiment of this application provides a data transmission method. The method includes:

obtaining, by a first node, to-be-sent frames; and sending, by the first node, a to-be-sent frame whose classification attribute value belongs to a first frequency block classification range to a second node by using a first frequency block, where the first frequency block is one of at least two frequency blocks between the first node and the second node; and the classification attribute value of the to-be-sent frame includes at least one of the following information: a frame type, a transmission rate, quality of service, a quality of service access category, a spatial stream, sending duration, a data packet format, or a data packet bandwidth.

The first node sends the to-be-sent frame whose classification attribute value belongs to the first frequency block classification range to the second node by using the first frequency block. The frequency block used to send the to-be-sent frame is determined in the first node and the second node based on at least one of the classification attribute values such as the frame type, the transmission rate, quality of service, the spatial stream, the sending duration, the data packet format, or the data packet bandwidth of the to-be-sent frame. In this case, frames that affect a frequency block throughput rate and an average latency, such as frames with a relatively low transmission rate and relatively low quality of service, may be concentrated in one frequency block for transmission, and frames with a relatively high transmission rate and relatively high quality of service can be concentrated in another frequency block for transmission. In this way, a throughput rate of the frequency block can be increased, or an overall latency level of the frequency block can be decreased, thereby improving satisfaction of an upper-layer service requirement.

With reference to the first aspect, in a first possible implementation of the first aspect, the first frequency block classification range includes one or any combination of the following conditions:

the frame type is a data frame and the transmission rate is less than or equal to a preset rate classification threshold, and the frame type is a data frame and the quality of service is lower than or equal to a preset quality classification threshold.

With reference to the first aspect or the first possible implementation of the first aspect, in a second implementation of the first aspect, the first frequency block classification range includes:

the frame type is a first-type frame; and the first-type frame includes at least one of: a probe request frame, a probe response frame, an association request frame, an association response frame, an authentication frame, and a management frame used to set up or tear down a first service, where the first service includes at least one of a traffic stream, a quiet time period, a target wakeup time, a tunneled direct link setup, and a block acknowledgment frame.

With reference to any one of the first aspect, or the first to the second possible implementations of the first aspect, in a third possible implementation of the first aspect, the first frequency block classification range includes: the frame type is a third-type frame, where the third-type frame carries indication information used by the second node in a second frequency block at a preset target time, and a dialog token; and the method further includes:

sending, by the first node, a to-be-sent frame whose classification attribute value belongs to a second frequency block classification range by using the second frequency block in the at least two frequency blocks; where the second frequency block classification range includes: the frame type is a short synchronization frame, and the short synchronization frame carries the dialog token corresponding to the third-type frame; and the dialog token is used to instruct the second node to read the indication information that is used in the second frequency block and carried in the third-type frame and that corresponds to the short synchronization frame, when receiving the short synchronization frame in the second frequency block at the target time.

With reference to the third possible implementation of the first aspect, in a fourth possible implementation of the first aspect, the third-type frame includes:

a first beacon frame, where the first beacon frame carries beacon information used in the second frequency block at the target time; and a first scheduling frame, where the first scheduling frame carries scheduling information used in the second frequency block at the target time.

With reference to any one of the first aspect, or the first to the second possible implementations of the first aspect, in a fifth possible implementation of the first aspect, the method further includes:

sending, by the first node, a to-be-sent frame whose classification attribute value belongs to a second frequency block classification range by using a second frequency block in the at least two frequency blocks; where the second frequency block is another one of the at least two frequency blocks between the first node and the second node.

With reference to the fifth possible implementation of the first aspect, in a sixth possible implementation of the first aspect, the second frequency block classification range includes: the frame type is a second-type frame, and the second-type frame includes a synchronization-type frame that is used to implement a synchronization function in the second frequency block.

With reference to the sixth possible implementation of the first aspect, in a seventh possible implementation of the first aspect, the synchronization-type frame includes at least one of the following:

a beacon frame used to be sent in the second frequency block, a scheduling frame carrying scheduling information of the second frequency block.

With reference to any one of the third to the seventh possible implementations of the first aspect, in a seventh possible implementation of the first aspect, the first frequency block classification range includes any one or any combination of the following conditions:

the transmission rate is less than or equal to a preset transmission rate classification threshold, and the quality of service is lower than or equal to a preset quality of service classification threshold.

With reference to any one of the first aspect, or the first to the seventh possible implementations of the first aspect, in an eighth possible implementation of the first aspect, the first frequency block classification range includes any one or any combination of the following conditions:

the sending duration is greater than or equal to a preset duration classification threshold, the quality of service access category belongs to a preset classification access category, and the packet format belongs to a preset classification packet format.

With reference to any one of the first aspect, or the first to the second possible implementations of the first aspect, in a ninth possible implementation of the first aspect, the method further includes:

sending, by the first node, a to-be-sent frame whose classification attribute value does not belong to the first frequency block classification range to the second node by using any one of the at least two frequency blocks.

With reference to any one of the first aspect, or the first to the ninth possible implementations of the first aspect, in a tenth possible implementation of the first aspect, before the sending, by the first node, a to-be-sent frame whose classification attribute value belongs to a first frequency block classification range to a second node by using a first frequency block, the method further includes:

sending, by the first node, a multiband enable request to the second node in the first frequency block; and receiving a multiband enable response that is sent by the second node in the first frequency block; or receiving, by the first node, a multiband enable request sent by the second node in the first frequency block; and sending a multiband enable response to the second node in the first frequency block.

According to a second aspect, an embodiment of this application provides a data transmission apparatus. The apparatus includes a processing module and a transceiver module. The processing unit executes an instruction to control the apparatus to perform the method in any one of the first aspect or the possible designs of the first aspect.

In a possible implementation, the apparatus may further include a storage module.

In a possible implementation, the apparatus may be a first node, or may be a chip in a first node.

When the apparatus is the first node, the processing module may be a processor, and the transceiver module may be a transceiver. If the storage module is further included, the storage module may be a memory.

When the apparatus is the chip in the first node, the processing module may be a processor, and the transceiver module may be an input/output interface, a pin, a circuit, or the like. If the storage module is further included, the storage module may be a storage module (for example, a register or a cache) in the chip, or may be a storage module (for example, a read-only memory or a random access memory) outside the chip.

The processor mentioned anywhere above may be a general purpose central processing unit (Central Processing Unit, CPU for short), a microprocessor, an application-specific integrated circuit (application-specific integrated circuit. ASIC for short), or one or more integrated circuits configured to control program execution of the spatial multiplexing methods in the foregoing aspects.

According to a third aspect, this application provides a computer-readable storage medium. The computer-readable storage medium stores an instruction, where the instruction may be executed by one or more processors in a processing circuit. When the instruction is run on a computer, the computer is enabled to perform the method in any one of the first aspect or the possible implementations of the first aspect.

According to a fourth aspect, a computer program product including an instruction is provided. When the computer program product runs on a computer, the computer is enabled to perform the methods according to any one of the first aspect or the possible implementations of the first aspect.

BRIEF DESCRIPTION OF DRAWINGS

To describe the technical solutions in this application or in the prior art more clearly, the following briefly describes the accompanying drawings for describing the embodiments or the prior art. Apparently, the accompanying drawings in the following description show some embodiments of this application, and a person of ordinary skill in the art may still derive other drawings from these accompanying drawings without creative efforts.

DESCRIPTION OF EMBODIMENTS

Figure 1:
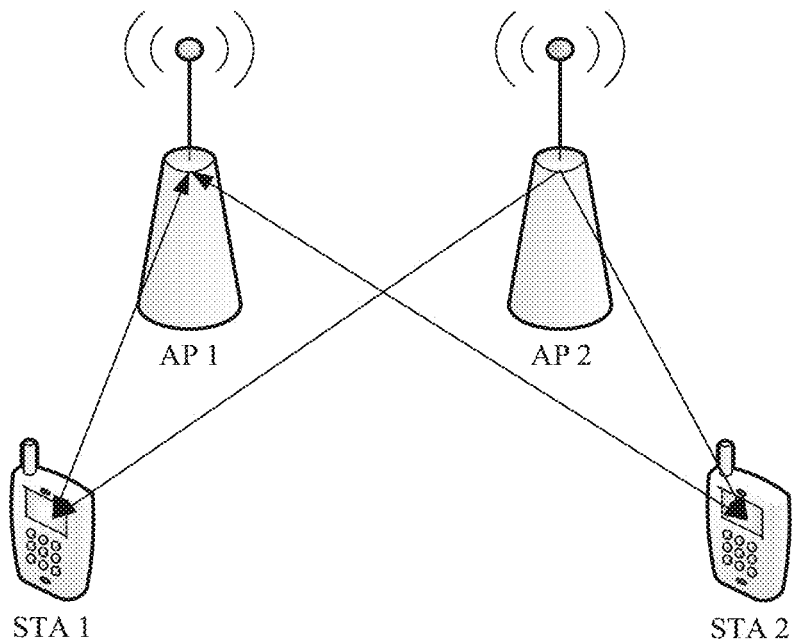
FIG. 1 is a schematic diagram of a network architecture.

Terms used in implementations of this application are only used to explain specific embodiments of this application, and are not intended to limit this application.

The data transmission method provided in this application may be used in a plurality of fields of wireless communications technologies, for example, the field of a wireless local area network (WLAN). In this application, a node may be a network device that supports multiband wireless communication, for example, a terminal, a base station, and a server. A problem that needs to be resolved in the field of wireless communications technologies is to improve a throughput rate and reduce a latency during data transmission over an air interface between nodes, to meet a requirement of a continuously developing service.

The following briefly describes an application scenario of the data transmission method provided in this application.

In an actual air interface transmission scenario, for example, in a street, data packets whose transmission rates are 1 Mbps (Mega-bit per second, megabit per second) and 2 Mbps account for 75% of all data packets. These low-rate data packets are usually management frames and control frames. The management frames and control frames may be used to carry control information such as frequency block management, controlling of data receiving and sending, and silence setting. These management frames and control frames are usually transmitted in relatively reliable manner. Therefore, a transmission rate may be relatively low, or an air interface occupation time is relatively long. For example, the management frames and the control frames may include:

a beacon (Beacon) frame, used by an access point (AP, Access Point) to broadcast corresponding information of a cell to stations (Station, STA) of an entire BSS (Basic Service Set, basic service set, which is equivalent to a cell), where the corresponding information of the cell includes BSS identification information, capability information, operation information, a time stamp, or the like:

an acknowledge (Acknowledge, ACK) frame/block acknowledge (Block Acknowledge, BA) frame, used to acknowledge a data frame; and a request to send (Request to Send, RTS) frame/clear to send (Clear to Send, CTS) frame, used for reserving a transmit opportunity (Transmit Opportunity, TXOP), to ensure data transmission between a transmit end and a receive end.

These low-rate data packets occupy a large proportion of transmission time over the air interface, greatly reducing a throughput of the entire BSS and increasing a data transmission latency. For example, a maximum supported data rate defined in the 802.11ax standard is 9.6 Gbps (Giga-bit per second, gigabit per second). That is, when high-speed data transmission is performed at this rate in a same time period, a very large throughput rate can be obtained, and a latency can be reduced.

Currently, there is an urgent need to improve a throughput rate and reduce a latency to support these services that require a very high throughput rate and a very low latency, for example, 8K video, VR (Virtual Reality, virtual reality), or AR (Augmented Reality, augmented reality).

In the data transmission method provided in this application, multiband transmission may be performed between a first node and a second node. For example, to-be-transmitted data is a MAC frame at a MAC layer. The first node may generate or obtain the MAC frame at the MAC layer, and then sends data included in the MAC frame to the second node by using at least two frequency blocks of a physical layer (PHY).

In this application, on a basis of the multiband transmission, when sending the MAC frame, the first node that needs to send data may determine a frequency block used to send a to-be-sent frame, in the first node and the second node based on at least one classification attribute value such as a frame type, a transmission rate, quality of service, a spatial stream, sending duration, a data packet format, or a data packet bandwidth of the to-be-sent frame. MAC frames with a relatively low transmission rate and relatively low quality of service that affect a frequency block throughput rate and an average latency are concentrated in one frequency block for transmission, so that MAC frames with a relatively high transmission rate and relatively high quality of service can be transmitted in another frequency block in a centralized manner. In this way, a throughput rate of the another frequency block and a throughput rate between nodes can be improved, and an average latency between the nodes can be reduced, thereby improving satisfaction of a service requirement.

The following briefly describes a network structure of the data transmission method provided in this application.

FIG. 1 is a schematic diagram of a network architecture. For example, in a WLAN scenario including a plurality of basic service sets (BSS), a system structure of the network may include a plurality of nodes. The nodes may be network side devices or terminal side devices. The network side devices may be, for example, access points (Access Point, AP), and the terminal-sides device may be, for example, stations (Station, STA). Each AP and a STA associated with the AP form a BSS. In the network, the plurality of nodes may communicate with each other. For example, a plurality of APs may communicate with a plurality of APs, a plurality of STAs may communicate with a plurality of STAs, and a plurality of APs may also communicate with a plurality of STAs.

The data transmission method provided in this application may be used in an air interface transmission scenario in which a plurality of nodes perform transmission with a plurality of nodes, for example, a plurality of APs perform transmission with a plurality of APs, a plurality of STAs perform transmission with a plurality of STAs, and a plurality of APs perform transmission with a plurality of STAs.

The following describes in detail the data transmission method provided in this application.

Embodiment 1

Figure 2:
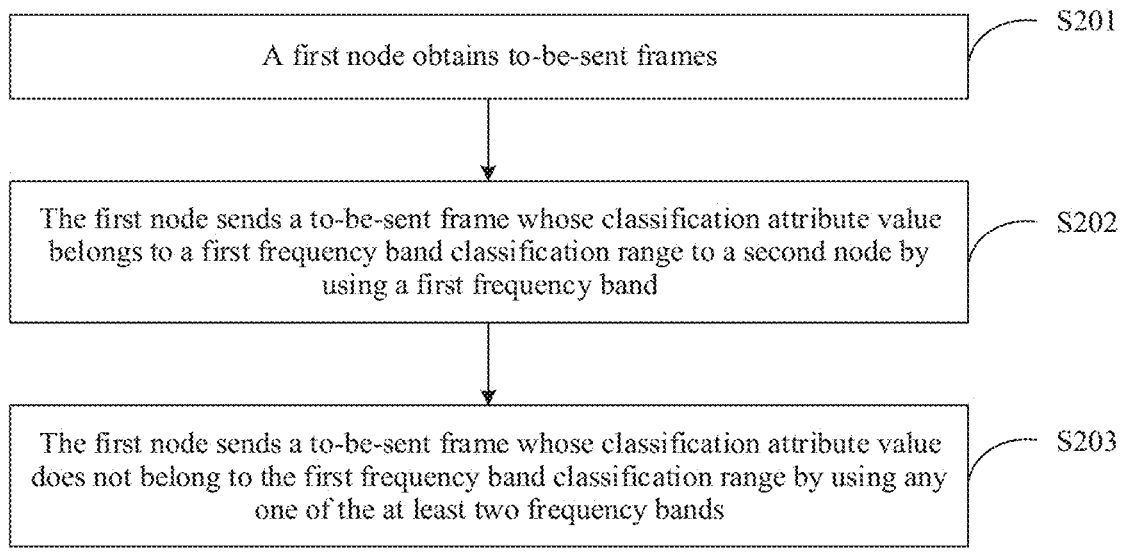
FIG. 2 is a schematic flowchart 1 of a data transmission method according to this application.

FIG. 2 is a schematic flowchart 1 of a data transmission method according to this application. This embodiment of this application may be executed by a first node. As shown in FIG. 2, this embodiment of this application may include the following steps:

S201. The first node obtains to-be-sent frames.

S202. The first node sends a to-be-sent frame whose classification attribute value belongs to a first frequency block classification range to a second node by using a first frequency block.

The first frequency block is one of at least two frequency blocks between the first node and the second node; and the classification attribute value of the to-be-sent frame includes at least one of the following information: a frame type, a transmission rate, quality of service, a quality of service access category, a spatial stream, sending duration, a data packet format, or a data packet bandwidth.

S203. The first node sends a to-be-sent frame whose classification attribute value does not belong to the first frequency block classification range by using any one of the at least two frequency blocks.

In this application, the first node may be an AP or a STA, and the second node may be an AP or a STA. In other words, the data transmission method provided in this application may be used in data transmission between APs, or may be used in data transmission between STAs, or may further be used in data transmission between an AP and a STA. In another embodiment of this application, the first node and the second node may alternatively be a communications server, a router, a switch, a bridge, a computer, a mobile phone, or the like.

In this application, the first node may obtain or generate a to-be-sent frame based on to-be-sent data. The to-be-sent data may be, for example, service data or signaling data. For example, the to-be-sent frame may be a MAC frame, and the to-be-sent data may be packet data obtained from an upper layer of a MAC layer, or management data and control data that are generated based on a management or service control requirement of the MAC layer. After the to-be-sent frame is obtained, the to-be-sent frame needs to be sent to the second node in a frequency block by using a PHY layer.

In this application, the first node may preset a classification criterion, and the classification criterion may include a frequency block classification range corresponding to at least one of the at least two frequency blocks. The classification criterion may be used by the first node to determine a target frequency block for sending each to-be-sent frame in the at least two frequency blocks based on a frequency block classification range corresponding to each frequency block in the classification criterion. For example, the first node may determine the target frequency block for the to-be-sent frame based on a frame type and a transmission rate of the to-be-sent frame. If the to-be-sent frame is a data frame and the transmission rate is less than or equal to a preset rate classification threshold, the first node determines the first frequency block as the target frequency block of the to-be-sent frame.

In this application, the to-be-sent frame whose classification attribute value does not belong to the first frequency block classification range may be sent by using a second frequency block or the first frequency block in the at least two frequency blocks. For example, if there are a plurality of to-be-sent frames that do not meet the first frequency block classification range, the plurality of to-be-sent frames that do not meet the first frequency block classification range may all be sent by using the second frequency block, or all the plurality of to-be-sent frames are sent by using the first frequency block, or some of the plurality of to-be-sent frames may be sent by using the second frequency block and some are sent by using the first frequency block.

For example, the at least two frequency blocks include the first frequency block and the second frequency block. Table 1-1 is a schematic diagram of the classification criterion.

TABLE 14

| Classification criterion | First frequency block | Second frequency block |
| --- | --- | --- |
| Belonging to the first frequency block classification range | √ | x |
| Not belonging to the first frequency block classification range | √ | √ |

The first frequency block classification range is a frequency block classification range corresponding to the first frequency block.

Table 1-2 is another schematic diagram of the classification criterion.

TABLE 1-2

| Classification criterion | First frequency block | Second frequency block |
| --- | --- | --- |
| Belonging to the first frequency block classification range | √ | x |
| Not belonging to the first frequency block classification range | x | √ |

Alternatively, it may be determined, according to the classification criterion shown in Table 1-2, that the to-be-sent frame whose classification attribute value does not belong to the first frequency block classification range is sent to the first node by using the second frequency block.

This application provides a plurality of implementations of the first frequency block classification range.

In an example, the first frequency block classification range may include any one or any combination of the following conditions:

the frame type is a data frame and the transmission rate is less than or equal to a preset transmission rate classification threshold, and the frame type is the data frame and the quality of service is lower than or equal to a preset quality of service classification threshold.

It should be noted that the combination of the foregoing plurality of conditions may be an intersection set or a union set of the plurality of conditions.

In this embodiment of this application, the quality of service of the to-be-sent frame may be one of several quality of service classes divided in advance, and the quality of service classification threshold may be one of the several quality of service classes. For example, the several quality of service classes may be sorted in ascending order, and the quality of service classification threshold may be a quality of service class ranked in the middle.

In an implementation provided in this application, that the first node sends a to-be-sent frame whose classification attribute value belongs to a first frequency block classification range to a second node by using a first frequency block may include:

if the to-be-sent frame is a data frame and the transmission rate is less than or equal to the preset transmission rate classification threshold, the first node sends the to-be-sent frame in the first frequency block; and if the to-be-sent frame is a data frame and the quality of service is lower than or equal to the preset quality of service classification threshold, the first node sends the to-be-sent frame in the first frequency block.

Table 1-3 is a schematic diagram of the first frequency block classification range.

TABLE 1-3

| Classification criterion | First frequency block | Second frequency block |
|---|---|---|
| The frame type is a data frame, and the transmission rate is less than or equal to the transmission rate classification threshold | √ | x |
| The frame type is a data frame, and the transmission rate is greater than the transmission rate classification threshold | √ | √ |
| The frame type is a data frame, and the quality of service is less than or equal to the quality of service classification threshold | √ | x |
| The frame type is a data frame, and the quality of service is greater than the quality of service classification threshold | √ | √ |
| The frame type is a management frame | No classification | No classification |
| The frame type is a control frame | No classification | No classification |

It should be noted that "no classification" means that when the frame type is a management frame or a control frame, and when the management frame or the control frame is corresponding to the first frequency block, the first frequency block is used for sending, or when the management frame or the control frame is corresponding to the second frequency block, the second frequency block is used for sending.

The manner of setting the first frequency block classification range is similar to that on a highway, a low-speed truck is allowed to travel only on a low-speed lane, and a high-speed car is allowed to travel on a high-speed lane, or a car is allowed to travel on both a high-speed lane and a low-speed lane, so that traffic efficiency can be improved.

Table 1-4 is a schematic diagram of the first frequency block classification range.

TABLE 1-4

| Classification criterion | First frequency block | Second frequency block |
|---|---|---|
| The frame type is a data frame, the transmission rate is less than or equal to the transmission rate classification threshold, and the quality of service is less than or equal to the transmission quality classification threshold | √ | x |
| The frame type is a data frame, the transmission rate is greater than the transmission rate classification threshold, or the quality of service is greater than the transmission quality classification threshold | √ | √ |

TABLE 1-4-continued

| Classification criterion | First frequency block | Second frequency block |
|---|---|---|
| The frame type is a management frame | No classification | No classification |
| The frame type is a control frame | No classification | No classification |

In another example, the first frequency block classification range may include:

the frame type is a first-type frame, and the first-type frame may include at least one of a probe request frame, a probe response frame, an association request frame, an association response frame, an authentication frame, and a management frame used to set up or tear down a first service, where the first service may include at least one of a traffic stream (Traffic Stream), a quiet time period (Quiet Time Period), a target wakeup time (Target Wakeup Time), a tunneled direct link setup (Tunnelled Direct-Link Setup, TDLS), and a block acknowledgment frame (Block ACK, BA).

Table 1-5 is a schematic diagram of the first frequency block classification range.

TABLE 1-5

| Classification criterion | First frequency block | Second frequency block |
|---|---|---|
| The frame type is a probe request frame, a probe response frame, an association request frame, an association response frame, or an authentication frame | √ | x |
| The frame type is a management frame used to set up or tear down a first service, where the first service includes at least one of a traffic stream, a quiet time period, a target wakeup time, a tunneled direct link setup, and a block acknowledgment frame | √ | x |
| The frame type is not the first-type frame | No classification | No classification |

For example, the first node may send a setup/teardown request frame of the foregoing corresponding service in the first frequency block, to request to set up a corresponding service in the second frequency block. The second node feeds back a corresponding response frame in the first frequency block, and replies whether to agree with a corresponding setup/teardown request. After the corresponding service is successfully set up, the first node and the second node may perform corresponding service interaction in the second frequency block according to an agreement established in the first frequency block.

When the first frequency block is 2.4 GHz with a relatively large quantity of stations and more interference, and the second frequency block is 5 GHz or 6 GHz with less interference, the 2.4 GHz frequency block has better anti-interference performance and is more suitable for sending a management frame. Therefore, if there may be a plurality of stations in a current network the foregoing manner of sending the first-type frame by using the first frequency block can be a reliable manner of transmitting an important management frame and control frame.

In still another example, the first frequency block classification range may include any one or any combination of the following conditions:

the sending duration is greater than or equal to a preset duration classification threshold, the quality of service access category belongs to a preset classification access category, and the packet format belongs to a preset classification packet format.

That the first node sends a to-be-sent frame whose classification attribute value belongs to a first frequency block classification range to second node by using a first frequency block may include:

if the sending duration of the to-be-sent frame is greater than or equal to the preset duration classification threshold, the first node sends the to-be-sent frame in the first frequency block;

if the quality of service access category of the to-be-sent frame belongs to the preset classification access category, the first node sends the to-be-sent frame in the first frequency block; and if the packet format of the to-be-sent frame belongs to the preset classification packet category the first node sends the to-be-sent frame in the first frequency block.

Table1-6 is a schematic diagram of the first frequency block classification range.

TABLE 1-6

| Classification criterion | First frequency block | Second frequency block |
|---|---|---|
| The sending duration is greater than or equal to the duration classification threshold | √ | x |
| The sending duration is less than the duration classification threshold | √ | √ |
| The quality of service access category belongs to the classification access category | √ | x |
| The quality of service access category does not belong to the classification access category | √ | √ |
| The packet format belongs to the classification packet format | √ | x |
| The packet format does not belong to the classification packet format | √ | √ |

That the first node sends a to-be-sent frame whose classification attribute value belongs to a first frequency block classification range to second node by using first frequency block may include: if the to-be-sent frame is the first-type frame, the first node sends the to-be-sent frame in the first frequency block.

It should be noted that the first frequency block classification range may be any one or a combination of the implementations of the first frequency block classification range provided in this application.

In another embodiment of this application, the transmission rate classification threshold, the quality of service classification threshold, the duration classification threshold, the classification access category and the classification packet format are further described in detail.

Table 1-7 is a schematic diagram of the first frequency block classification range.

TABLE 1-7

| Classification criterion | First frequency block | Second frequency block |
|---|---|---|
| The frame type is a data frame, and the transmission rate is less than or equal to the transmission rate classification threshold | √ | x |
| The frame type is a data frame, and the quality of service is less than or equal to the quality of service classification threshold | √ | x |
| The frame type is a probe request frame, a probe response frame, an association request frame, an association response frame, or an authentication frame | √ | x |
| The frame type is a management frame used to set up or tear down a first service, where the first service includes at least one of traffic stream, a quiet time period, target wakeup time, a tunneled direct link setup, and a block acknowledgment frame | √ | x |
| The frame type is not the first-type frame, and the sending duration is greater than or equal to the duration classification threshold | √ | x |
| The frame type is not the first-type frame, and the quality of service access category belongs to the classification access category | √ | x |
| The quality of service is greater than the quality of service classification threshold | √ | √ |
| The transmission rate is greater than the transmission rate classification threshold | √ | √ |
| The frame type is not the first-type frame, and the transmission duration is less than the duration classification threshold | √ | √ |
| The frame type is not the first-type frame and the quality of service access category does not belong to the classification access category | √ | √ |

Table 1-7 is a schematic diagram of a combination of the foregoing several implementations of the first frequency block classification range according to this embodiment of this application.

In this application, a management frame and a control frame other than the first-type frame may also be classified based on a transmission rate classification threshold a quality of service threshold, or the like that are the same as those of the data frame.

In this application, it should be noted that step 202 may be performed before step S203, and step S203 may be performed before step S202.

In the technical solution provided in this application, based on at least one classification attribute value such as the frame type, the transmission rate, the quality of service, the spatial stream, the sending duration, the data packet format, or the data packet bandwidth of the to-be-sent frame, and the first frequency block classification range that is set based on the classification attribute value, the frequency block used to send the to-be-sent frame is determined in at least two frequency blocks of the first node and the second node. MAC frames with a relatively low transmission rate and relatively low quality of service that affect a frequency block throughput rate and an average latency may be concentrated in one frequency block for transmission, so that frames with a relatively high transmission rate and relatively high quality of service can be transmitted in another frequency block in a centralized manner. In this way, a throughput rate of the another frequency block and a throughput rate between nodes can be improved, and an average latency between the nodes can be reduced, thereby improving satisfaction of a service requirement.

In addition, in this application, the first frequency block may be a low frequency block, and the second frequency block may be a high frequency block. The low frequency block is relative to the high frequency block.

It should be noted that, in the WLAN field, some unlicensed spectra are usually used as operating bands of the WLAN, and the operating bands of the WLAN are mainly distributed below 1 GHz, 2.4 GHz, 5 GHz, 60 GHz, or the like. Mainstream WLAN standards include 802.11a/b/g/n/ac/ax. These mainstream WLAN standards usually use a 2.4 GHz frequency band or a 5 GHz frequency band, where the 5 GHz frequency band may refer to 4.9 GHz and 5 GHz. Recently, the 802.11ax standard also uses a 6 GHz spectrum that may be used as an unlicensed spectrum subsequently as an operating spectrum of the 802.11ax standard.

In air interface transmission, different frequency bands have different characteristics for data transmission. A low frequency band is usually characterized by relatively slow signal attenuation and a relatively good wall penetration effect. However, because a spectrum of the low frequency band is usually relatively limited, a rate is sometimes limited by a size of the spectrum. For example, in the 2.4 GHz frequency band, a bandwidth of a data packet in the 802.11 b/g/n/ax standard is 20 MHz, and a maximum of 40 MHz is supported. Channels partially overlap, which affects continuous use of a plurality of channels. For the above reasons, it is decided that the 802.11a/ac will not use 2.4 GHz as its operating spectrum. Spectrum resources in a high frequency band are usually richer than those in a low frequency band. For example, compared with relatively crowded 2.4 GHz, spectrum resources in a 5 GHz frequency band and a 6 GHz frequency band are richer. Therefore, the high frequency band is generally more suitable for large-bandwidth and high-rate data transmission than the low frequency band. For example, 802.11ac and 802.11ax support data transmission at a maximum of 160 MHz. It should be noted that the high frequency band and the low frequency band are relative concepts. For example, in comparison of a frequency band below 1 GHz and a 2.4 GHz frequency band, the 2.4 GHz frequency band may be used as the high frequency band. For another example, in comparison of the 2.4 GHz frequency band and the 5 GHz frequency band, the 2.4 GHz frequency band may be used as the low frequency band.

Therefore, if a frequency band of the first frequency block is lower than a frequency band of the second frequency block, and a frequency band bandwidth of the first frequency block is lower than a frequency band bandwidth of the second frequency block, a manner in which the MAC frames that affect the throughput rate and the latency are concentrated in the first frequency block for transmission is used, so that the second frequency block with a relatively large bandwidth can focus on high-speed data transmission, thereby improving a throughput rate between nodes during multiband transmission.

Embodiment 2

This application further provides a data transmission method. In this embodiment of this application, for some frames with relatively low transmission efficiency such as low-rate frames or low quality of service frames that need to be transmitted in a second frequency block, a manner of classifying the frames and sending the frames by using a first frequency block and the second frequency block is designed, that is, information carried in the low-rate frames or the low quality of service frames is sent through cooperation between the first frequency block and the second frequency block, so that a throughput rate between nodes can be improved as much as possible while ensuring a basic function of the low-rate frames or the low quality of service frames.

Figure 3:
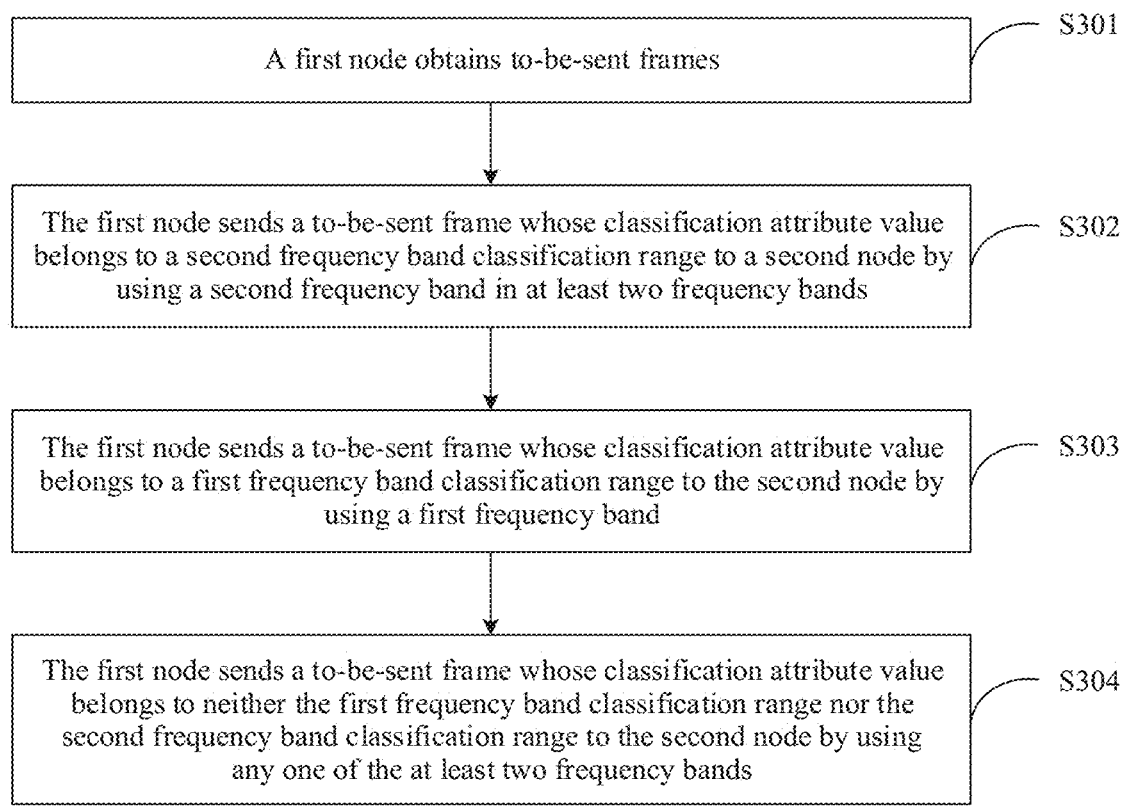
FIG. 3 is a flowchart 2 of a data transmission method according to this application.

FIG. 3 is a flowchart 2 of a data transmission method according to this application. As shown in FIG. 3, this embodiment of this application may include the following steps:

S301. A first node obtains to-be-sent frames.

S302. The first node sends a to-be-sent frame whose classification attribute value belongs to a second frequency block classification range to a second node by using a second frequency block in at least two frequency blocks.

S303. The first node sends a to-be-sent frame whose classification attribute value belongs to a first frequency block classification range to the second node by using a first frequency block.

S304. The first node sends a to-be-sent frame whose classification attribute value belongs to neither the first frequency block classification range nor the second frequency block classification range to the second node by using any one of the at least two frequency blocks.

Step S303 is similar to S202, and reference may be made to the description in S202. Step S304 is similar to S203, and reference may be made to the description in S203.

It should be noted that the second frequency block is another frequency block in the at least two frequency blocks between the first node and the second node. If there is an intersection between the second frequency block classification range and the first frequency block classification range, step S302 may be first performed, and then step S303 is performed. For example, it is first determined whether the classification attribute value of the to-be-sent frame belongs to the second frequency block classification range. If the classification attribute value of the to-be-sent frame belongs to the second frequency block classification range, the to-be-sent frame is sent by using the second frequency block. If the classification attribute value of the to-be-sent frame does not belong to the second frequency block classification range, it is further determined whether the classification attribute value of the to-be-sent frame belongs to the first frequency block classification range. If the classification attribute value of the to-be-sent frame belongs to the first frequency block classification range, the to-be-sent frame is sent by using the first frequency block. If the classification attribute value of the to-be-sent frame belongs to neither the first frequency block classification range nor the second frequency block classification range, the to-be-sent frame may be sent by using either of the two frequency blocks. If there is no intersection between the second frequency block classification range and the first frequency block classification range, step S302 may be performed before step S303, or step S303 may be performed before step S302.

It should be noted that any implementation of the first frequency block classification range in the embodiment shown in FIG. 2 may be used as the first frequency block classification range. In addition, various implementations of the first frequency block classification range provided in this application may also be used in combination.

Table 2-1 is a schematic diagram of a classification criterion, and the classification criterion provided in this embodiment of this application may be shown in Table 2-1.

TABLE 2-1

| Classification criterion | First frequency block | Second frequency block |
|---|---|---|
| Belonging to the first frequency block classification range | √ | x |
| Belonging to the second frequency block classification range | x | √ |
| Belonging to neither the first frequency block Classification range nor the second frequency block classification range | √ | √ |

In this application, the second frequency block classification range may be a frequency block classification range corresponding to the second frequency block.

In an implementation of the second frequency block classification range provided in this application, the second frequency block classification range may include: a control frame or a management frame that carries some control information, management information, or another piece of indication information that needs to be sent in the second frequency block. For example, the control information and the management information that need to be sent in the second frequency block may be synchronization information used for synchronization.

In an implementation provided in this embodiment of this application, the second frequency block classification range may include: a frame type is a second-type frame.

For example, the second-type frame may include a synchronization-type frame used to implement a synchronization function in the second frequency block. The synchronization-type frame may include, for example, at least one of the following:

a beacon frame used to be sent in the second frequency block, a scheduling frame carrying scheduling information of the second frequency block.

For example, the scheduling frame may be a trigger frame.

Table 2-2 is a schematic diagram of the second frequency block classification range.

TABLE 2-2

| Classification criterion | First frequency block | Second frequency block |
|---|---|---|
| The frame type is a synchronization-type frame carrying synchronization information used in the second frequency block | x | √ |
| The frame type is not a synchronization-type frame carrying synchronization information used in the second frequency block | No classification | No classification |

A manner of sending the second-type frame by using the second frequency block is equivalent to determining that a synchronization-type frame carrying synchronization information is to be sent in the second frequency block.

In another implementation of the second frequency block classification range provided in this embodiment of this application, the second frequency block classification range may include:

the frame type is a short synchronization frame, where the short synchronization frame carries a dialog token corresponding to a third-type frame.

The first frequency block classification range may include:

the frame type is the third-type frame, where the third-type frame carries indication information used by the second node in the second frequency block at a preset target time, and the dialog token; and the dialog token is used to instruct the second node to read the indication information that is used in the second frequency block and carried in the third-type frame and that corresponds to the short synchronization frame, when receiving the short synchronization frame in the second frequency block at the target time.

Table 2-3 is a schematic diagram of a classification criterion.

TABLE 2-3

| Classification criterion | First frequency block | Second frequency block |
|---|---|---|
| The frame type is a third-type frame, and the third-type frame carries the indication information used by the second node in the second frequency block at the target time, and the dialog token | √ | x |
| The frame type is a short synchronization frame, and the short synchronization frame carries the dialog token corresponding to the third-type frame | x | √ |

For example, the third-type frame may include at least one of the following:

a first beacon frame, where the first beacon frame carries beacon information used in the second frequency block at the target time; and a first scheduling frame, where the first scheduling frame carries scheduling information used in the second frequency block at the target time.

In an implementation, a short synchronization frame corresponding to the first beacon frame may be referred to as a short-beacon frame, and a short synchronization frame corresponding to a first scheduling frame may be referred to as a short scheduling frame.

For example, the foregoing steps S302 and S303 may include: sending the third-type frame by using the first frequency block; and when the target time is approaching, sending the short synchronization frame by using the second frequency block. Then, the second node may search, based on the dialog token in the short synchronization frame, for a corresponding third-type frame received in the first frequency block, extract indication information from the third-type frame, and control, based on an indication of the indication information, a MAC frame sent in the second frequency block at the target time.

In another embodiment of this application, the first beacon frame, the first scheduling frame, and the short synchronization frame that corresponds to the first beacon frame and the short synchronization frame that corresponds to the first scheduling frame are described in detail. For details, refer to descriptions in the another embodiment of this application.

The third-type frame that carries the indication information used in the second frequency block and the short synchronization frame are used in cooperation. Because the short synchronization frame may carry the dialog token used to be associated with the third-type frame, the short synchronization frame may not need to carry specific indication information. Therefore, a length of the short synchronization frame may be relatively small, so that an amount of data that needs to be transmitted in the second frequency block can be reduced.

The following describes an example in which the first node is an AP, the second node is a STA, the first frequency block is Band 1, and the second frequency block is Band 2.

Figure 4:
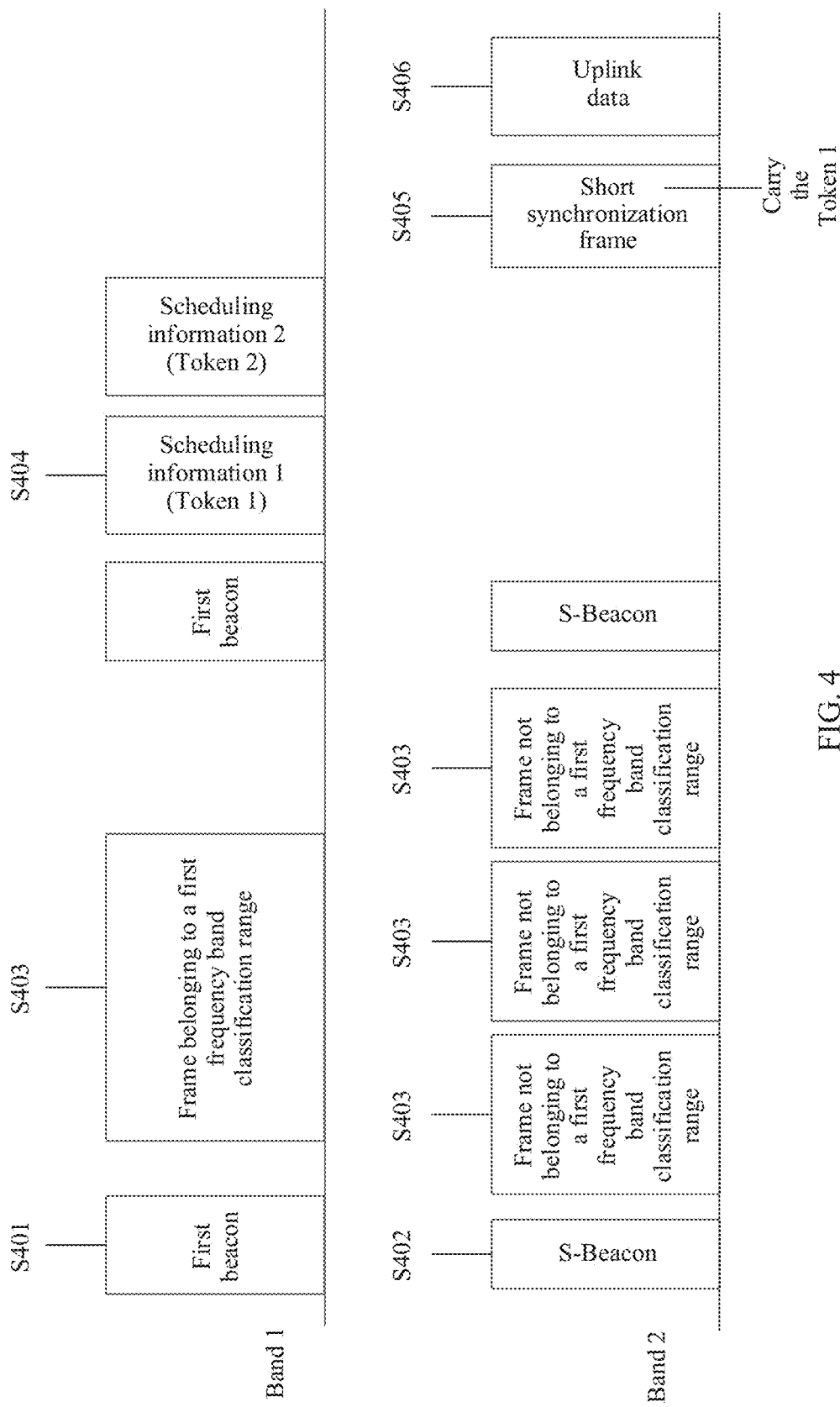
FIG. 4 is a schematic flowchart 1 of a data transmission method according to this application.

FIG. 4 is a schematic flowchart 1 of a data transmission method according to this application.

As shown in FIG. 4, a multiband coordinated transmission procedure using the data transmission method provided in this application may include the following steps:

S401. The AP sends a first beacon frame in Band 1.

The first beacon frame may include information such as capability information of the AP timestamp information, a beacon frame token (Token), a number of Band 2, and a location of a primary channel of Band 2. It should be noted that the first beacon frame may carry both capability information and operation information of Band 1 and capability information and operation information of Band 2.

S402. The AP sends a short-beacon frame in Band 2.

The short-beacon frame (Short-Beacon. S-Beacon) is used for time synchronization in Band 2, or the like. For example, a period of the short-beacon frame may be an integer multiple of a period of the first beacon frame. In an implementation, a length of a second beacon frame may be less than a length of the first beacon frame.

S403. The AP transmits data in Band 1 and/or Band 2.

Data whose transmission rate is less than or equal to a preset transmission rate classification threshold may be transmitted only in Band 1, and data whose transmission rate is greater than the transmission rate classification threshold may be transmitted only in Band 2, or data whose transmission rate is greater than the transmission rate classification threshold may be transmitted in both Band 1 and Band 2.

S404. The AP sends, in Band 1, a scheduling frame that carries scheduling information, to instruct the STA to perform data transmission in Band 2 at a target time.

For example, the scheduling information may include scheduling information 1 used at a first target time, and scheduling information 2 used at a second target time, where the scheduling information 1 carries a Token 1 (Token 1), and the scheduling information 2 carries a Token 2 (Token 2).

S405. The AP sends a short synchronization frame at the target time, to trigger the STA to send uplink data.

For example, the AP may send a short synchronization frame 1 at the first target time, where the short synchronization frame 1 carries the Token 1 (Token 1). It should be noted that the short synchronization frame may carry token information. Therefore, overheads of the short synchronization frame may be relatively small.

S406. The STA sends the uplink data based on scheduling information corresponding to the short synchronization frame.

The STA may search for corresponding scheduling information 1 based on the Token 1 in the short synchronization frame, and send the uplink data (UL Data) based on the scheduling information 1.

It should be noted that a horizontal axis of the schematic flowchart in this application is a time axis.

In this application, before the first node determines a target frequency block used to send a to-be-sent frame, in at least two frequency blocks according to a classification attribute value of the to-be-sent frame and a preset classification criterion, the first node may obtain indication information used in a first frequency block, and generate a third-type frame and a short synchronization frame based on the indication information.

In this application, if there is an intersection between the second frequency block classification range and the first frequency block range, a step of sending a to-be-sent frame that belongs to the second frequency block classification range by using the second frequency block may be first performed, and a step of sending a to-be-sent frame that belongs to the first frequency block classification range by using the first frequency block is performed later.

In this application, one frequency block includes a plurality of channels. In a standard in which an operating frequency block is a low frequency band, channels in the frequency block partially overlap. When sending uplink data to a same AP, a plurality of STAs may use different channels or resource units in the same frequency block, or use another frequency division, time division, or spatial multiplexing manner. The technical solutions provided in this application may be used together with the foregoing multiplexing manners, or may be used separately.

In some scenarios, at a sending node, a to-be-sent MAC frame needs to first contend for a channel resource for sending data. A contention mechanism for sending MAC frames may be set on a node, and a MAC frame with high quality of service is more likely to obtain a channel than a MAC frame with low quality of service through contention. Therefore, a manner of classifying to-be-sent frames based on quality of service can improve a success rate of obtaining a channel by the MAC frame with low quality of service through contention. In this way, a waiting time for sending the MAC frame with low quality of service is shortened, thereby reducing a latency of a frame with low quality of service.

For details and technical effects of other technical solutions in this embodiment of this application, refer to descriptions in other embodiments of this application.

Embodiment 3

Based on any one of the foregoing embodiments, this application further provides a data transmission method. Before a first node sends a to-be-sent frame whose classification attribute value belongs to a first frequency block classification range to a second node by using a first frequency block, the first node may negotiate with the second node to enable a multiband.

Figure 5:
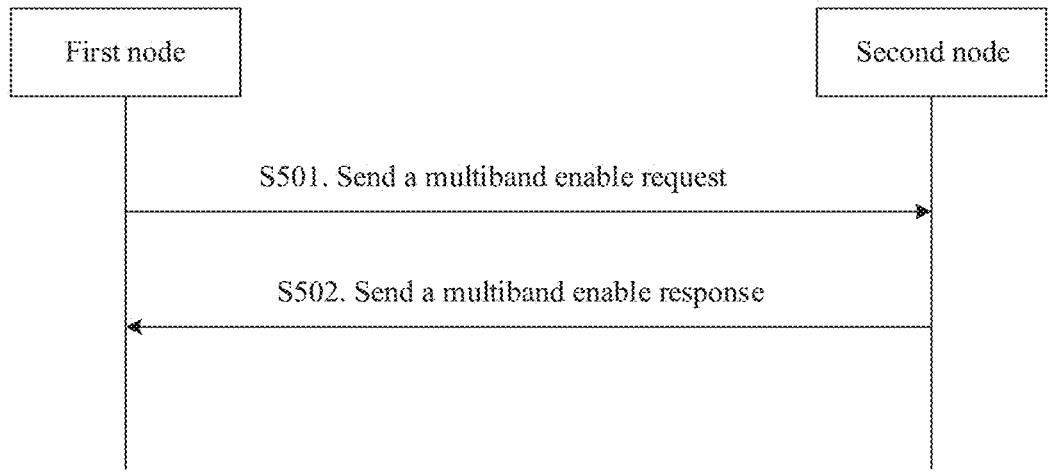
FIG. 5 is an interaction flowchart 1 of a data transmission method according to this application.

FIG. 5 is an interaction flowchart 1 of a data transmission method according to this application. As shown in FIG. 5, if the first node is an initiator that requests to enable the multiband, this embodiment of this application may include the following steps:

S501. The first node sends a multiband enable request to the second node in the first frequency block.

S502. The second node sends a multiband enable response to the first node in the first frequency block.

In this application, for example, the multiband enable request may be an association request (Association Request) frame, and the multiband enable response may be an association response (Association Response) frame.

It should be noted that, in another implementation of this application, the first node may also be a receiver that enables the multiband, and before the first node sends the to-be-sent frame whose classification attribute value belongs to the first frequency block classification range to the second node by using the first frequency block, steps in this embodiment of this application may include: the first node receives, in the first frequency block, a multiband enable request sent by the second node frequency block; and the first node sends a multiband enable response to the second node in the first frequency block.

In this application, the multiband may be enabled in two manners: active association and passive association.

The following describes an example in which the first node is an AP, the second node is a STA, the first frequency block is Band 1, and the second frequency block is Band 2.

Figure 6:
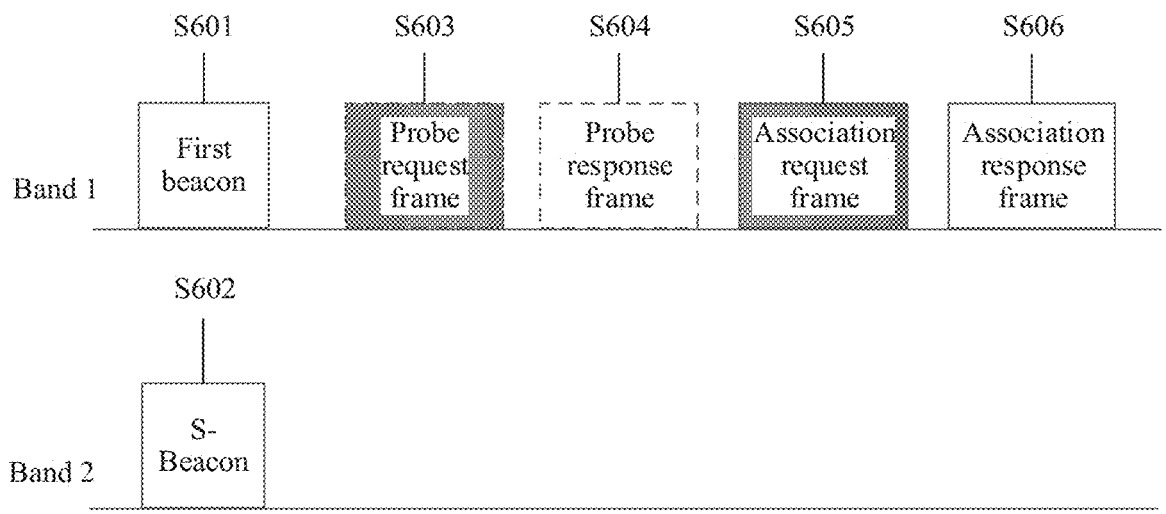
FIG. 6 is a schematic flowchart of an association manner according to this application.
Figure 6:
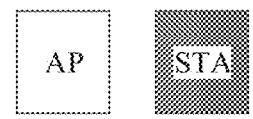

FIG. 6 is a schematic flowchart of an association manner according to this application. As shown in FIG. 6, the STA may be an initiator that enables a multiband, and an interaction process of enabling the multiband in an association manner between the AP and the STA may include the following steps:

S601. The AP sends a first beacon frame in Band 1.

The beacon frame may include information such as capability information, operation information, timestamp information, a beacon frame Token (Token) of the AP, a number of Band 2, and a location of a primary channel of Band 2. For example, the AP may periodically send the beacon frame. It should be noted that the first beacon frame may carry both capability information and operation information of Band 1 and capability information and operation information of Band 2.

S602. The AP sends a short-beacon frame in Band 2.

The short-beacon frame is used for time synchronization in Band 2, or the like. For example, a period of the short-beacon frame may be an integer multiple of a period of the first beacon frame.

S603. The STA sends a probe request frame in Band 1.

The probe request (Probe Request) frame indicates that the STA expects to perform an association operation. The probe request frame may include capability information of the STA, where the capability information indicates that the STA supports a multiband operation, and the capability information also indicates capability information of the STA in Band 1 and capability information of the STA in Band 2.

S604. After receiving, in Band 1, the probe request frame sent by the STA, the AP sends a probe response frame to the STA.

The probe response frame indicates the capability information, the operation information, or the like of the AP and the probe response frame may further indicate that the AP supports a multiband operation, and capability information of the AP in Band 1 and capability information of the AP in Band 2.

S605. The STA sends an association request frame in Band 1.

The association request frame is used to request the AP to enable an association. The association request frame may include the capability information of the STA, where the capability information indicates that the STA supports a multiband operation, and the association request frame may indicate the capability information of the STA in Band 1 and the capability information of the STA in Band 2.

S606. The AP sends an association response frame in Band 1.

The association response frame is used to respond to the association request frame. The association request frame includes the capability information of the AR where the capability information indicates that the AP supports a multiband operation, and indicates the capability information of the AP in Band 1 and the capability information of the AP in Band 2.

It should be noted that, after the association succeeds, both the AP and the STA may perform data transmission in Band 1 and Band 2, and do not need to perform the association operation in Band 2. The STA can calibrate time by using a short-beacon frame in Band 2. In addition, the STA may further read the first beacon frame in Band 1, to obtain related information of BSS.

It should be further noted that the foregoing steps S603 and S604 are not mandatory steps for performing the association operation. For the passive association mode, in step S601, after the STA receives the first beacon frame in Band 1, the STA may directly perform steps S605 and S606 to perform the association operation.

In this application, before performing the association operation, the STA may disable some or all links of Band 2. A link in this application may refer to a radio frequency or an antenna. In this way, when Band 2 needs to be enabled, Band 2 is enabled to be associated with Band 1, thereby saving energy. In an implementation of this application, when the AP and the STA perform multiband coordinated transmission, the AP may instruct, in Band 1, the STA to disable some or all links in Band 2. In this way, Band 2 can be flexibly controlled to save electric energy.

For details and technical effects of other technical solutions in the embodiments of this application, refer to descriptions in other embodiments of this application.

Embodiment 4

The following describes in detail a setting manner of setting classification thresholds based on various classification attribute values as mentioned in the foregoing embodiments.

In an implementation provided in this application, a classification criterion between nodes, that is, a first frequency block classification range, a second frequency block classification range, or the like, may be indicated when multiband coordination is enabled. For example, an indication may be made in a first beacon frame or a probe response frame. For example, the indication may be made by an AP in the first beacon frame or the probe response frame.

In an implementation provided in this application, an extremely high throughput (Extremely High Throughput, EHT) operation element (Operation Element) may be used to indicate a frequency block classification range corresponding to each frequency block. For example, the EHT operation element may be carried in the first beacon frame or the probe response frame.

In another implementation provided in this application, different first frequency block classification ranges may be further set for different spatial streams (Spatial Streams, SS). For example, different transmission rate classification thresholds may be set for the different spatial streams.

For a next-generation EHT standard, there may be a total of 16 spatial streams, and a threshold may be designed for each spatial stream. Table 4-1 is a schematic diagram of setting thresholds for different spatial streams.

TABLE 4-1

| Threshold for 1 SS | Threshold for 2 SS | ... | Threshold for 16 SS |
| --- | --- | --- | --- |

For example, Threshold for 1 SS may represent a threshold that is set for a spatial stream whose identifier is 1.

In still another implementation provided in this application, a unified rate identifier may be used to indicate a transmission rate classification threshold.

In an example, 00 may be used to indicate 121.9 Mbps, 01 may be used to indicate 248.3 Mbps, or the like.

In another example, a rate identifier may be a modulation and coding scheme (Modulation and Coding Scheme). It should be noted that different MCSs may correspond to different rates. For example, the 802.11ax standard currently supports 12 different MCSs, such as MCS0 to MCS11. For example, two bits may be used to set the Threshold for 1/2 . . . /16 SS indication. To improve indication precision, four bits may also be used to indicate a classification threshold value of a maximum of 16 MCSs.

Table 4-2 is a schematic diagram of an MCS indicated by using two bits.

TABLE 4-2

| Enumerated values when a rate identifier is indicated by using two bits | Corresponding MCS |
|---|---|
| 00/ | MCS1 |
| 01/ | MCS3 |
| 10/ | MCS5 |
| 11/ | MCS7 |

As shown in Table 4-2, the rate identifier may be sent when classification threshold of each frequency block is indicated. For example, "00" may be sent to indicate that the first frequency block classification range includes the transmission rate classification threshold, and the transmission rate classification threshold is a transmission rate represented by MCS1.

In still another implementation provided in this application, a frequency block classification threshold corresponding to each frequency block may be set based on a quality of service access category of a to-be-sent frame.

For example, an access category may include four types: voice (Voice, VO), video (Video, VI), background (Background, BK), and best effort (Best Effort, BE). Priorities of VO and VI are higher than those of BK and BE.

In an example, the first frequency block classification range may include the access category of BK and/or BE.

Table 4-3 is a schematic diagram of the first frequency block classification range.

TABLE 4-3

| Classification criterion | First frequency block | Second frequency block |
|---|---|---|
| The access category is BK and/or BE | √ | x |
| The access category is VO and/or VI | √ | √ |

For example, a data frame of the access category BK may be transmitted in the first frequency block; a data frame of the access category BE may be transmitted in the first frequency block; and a data frame of the access category VO or VI may be transmitted in the second frequency block, or may be transmitted in the second frequency block and the first frequency block.

In still another implementation provided in this application, the frequency block classification threshold corresponding to each frequency block may be set based on sending duration of the to-be-sent frame.

The sending duration of the to-be-sent frame may be pre-specified, or may be calculated based on parameters such as an amount of data that needs to be transmitted and a transmission rate. For example, the pre-specified sending duration may be, for example, expected transmission duration of the to-be-sent frame. For example, sending duration occupied by a low-rate frame and a high-rate frame may be not directly proportional to lengths of the frames. The sending duration calculated may be, for example, calculated based on an amount of data that needs to be sent, a bandwidth, an MCS, and a quantity of spatial streams.

The duration classification threshold may be flexibly set based on a quantity of to-be-sent frames that need to be classified. For example, within a preset period of time, in sending duration, 40% of to-be-sent frames with a relatively long sending time can be sent to the second node by using the first frequency block. The sending duration may be set as the duration classification threshold.

It should be further noted that, a frame with relatively long sending duration occupies much air interface time during transmission, and a frame with relatively short sending duration can obtain, through contention, a channel for sending data only after transmission of the frame with relatively long sending duration is completed. As a result, the frame with a relatively short sending duration needs to wait for a relatively long time. The to-be-sent frames are classified based on the sending duration, so that waiting time required for sending the frame with a relatively short sending duration can be shortened, thereby shortening a latency of the frame with a relatively short sending duration.

In still another implementation provided in this application, the frequency block classification threshold corresponding to each frequency block may be set based on a data packet format of the to-be-sent frame.

For example, various types of packet formats are defined in various generations of WLAN standards, for example:

non-high throughput (non-High Throughput, non-HT) data packet defined in 802.11a/b/g, high throughput (High Throughput, HT) data packet defined in 802.11n.

very high throughput (VHT) data packet defined in 802.11ac, high efficient (HE) data packet defined in 802.11ax, and extremely high throughput (Extremely High Throughput. EHT) data packet defined in the next-generation WLAN standard.

The VHT data packet may further include a VHT single-user data packet and a VHT multi-user data packet. The HE data packet may include an HE single-user data packet, an HE extended distance single-user data packet, an HE multi-user data packet, and an HE trigger-based data packet.

For example, a packet format corresponding to the first frequency block classification range may be one or more of the foregoing packet formats with minimum transmission rates.

In an example, it may be set that a packet classification format corresponding to the first frequency block classification range includes: non-HT. In this way, a data packet in the non-HT format may be transmitted in the first frequency block, and a data packet in another format such as the HT, VHT, HE, or EHT format may be transmitted in the second frequency block, or may be transmitted in the second frequency block and the first frequency block.

Table 4-4 is a schematic diagram of the first frequency block classification range.

TABLE 4-4

| Classification criterion | First frequency block | Second frequency block |
|---|---|---|
| The packet format is non-HT | √ | x |
| The packet format is an HT format, a VHT format, an HE format, or an EHT format | √ | √ |

In another example, it may be set that the packet classification format corresponding to the first frequency block classification range includes: non-HT and HT. In this way, data packets in the non-HT format and the HT format may be transmitted in the first frequency block, and data packets in other formats such as the VHT, the HE, and the EHT formats may be transmitted in the second frequency block, or may be transmitted in the second frequency block and the first frequency block.

It should be noted that the packet format is a format used when the to-be-sent frame is transmitted at a PHY layer.

In still another implementation provided in this application, the frequency block classification threshold corresponding to each frequency block may be set based on a data packet bandwidth of the to-be-sent frame.

For example, the data packet bandwidth of the to-be-sent frame may include different bandwidth modes such as 20 MHz, 40 MHz, 80 MHz, 160 MHz, 80+80 MHz, 320 MHz, and 160 MHz+160 MHz. Generally, a higher bandwidth may correspond to a higher peak rate.

A bandwidth classification threshold corresponding to the first frequency block classification range may be one or more of the foregoing grouping formats with minimum bandwidths.

In an example, the bandwidth classification threshold corresponding to the first frequency block classification range may include 20 MHz or 40 MHz. In this way, a to-be-sent frame corresponding to a bandwidth of 20 MHz or 40 MHz may be transmitted in the first frequency block, and a to-be-sent frame corresponding to a bandwidth of 80 MHz or higher may be transmitted in the second frequency block, or may be transmitted in the second frequency block and the first frequency block.

Table 4-5 is a schematic diagram of the first frequency block classification range.

TABLE 4-5

| Classification criterion | First frequency block | Second frequency block |
|---|---|---|
| The bandwidth is less than or equal to 40 MHz | √ | x |
| The bandwidth is greater than 40 MHz | √ | √ |

It should be noted that the packet bandwidth is an actual bandwidth of the PHY that sends the to-be-sent frame.

In still another implementation provided in this application, combination may be further performed based on a frequency block classification range corresponding to the classification attribute value mentioned in any one of the foregoing embodiments.

For example, the frequency block classification threshold corresponding to each frequency block may be set based on both a packet bandwidth and a packet format of the to-be-sent frame.

In an example, the first frequency block classification range may include:

the bandwidth is less than or equal to 40 MHz, and the packet format is non-HT or HT. In this way, a to-be-sent frame corresponding to a bandwidth less than or equal to 40 MHz and a format of non-HT or HT may be transmitted in the first frequency block, and a to-be-sent frame corresponding to a bandwidth of 80 MHz or higher or a packet format of VHT, HE, or EHT may be transmitted in the second frequency block, or may be transmitted in the second frequency block and the first frequency block.

In another example, the first frequency block classification range may include:

the bandwidth is less than or equal to 40 MHz, or the packet format is non-HT or HT. In this way, a to-be-sent frame corresponding to a bandwidth greater than or equal to 80 MHz and corresponding to a format, or corresponding to a packet format of VHT. HE and EHT may be transmitted in the second frequency block, or may be transmitted in the second frequency block and the first frequency block. Another to-be-sent frame may be transmitted in the first frequency block.

In still another implementation provided in this application, if there are two or more frequency blocks between the first node and the second node, all frequency blocks may share one set of classification criteria.

In still another implementation provided in this application, if there are four or more frequency blocks between the first node and the second node, the at least four frequency blocks may be divided into two groups, and each group uses one set of classification criteria. For example, each frequency block group may include at least two frequency blocks, at least two frequency blocks in each frequency block group are divided into the first frequency block and the second frequency block, and the first frequency block classification range or the second frequency block classification range are set for each frequency block group. For example, frequency blocks below 2.4 GHz and 1 GHz are used as one frequency block group, and a first classification criterion is used, and 5 GHz and 6 GHz are used as one frequency block group, and a second classification criterion is used.

In the foregoing manner, for some rules that affect a throughput rate and a latency, it is equivalent to classifying a channel or a frequency block into a fast lane or a slow lane, to ensure that a spectrum of the second frequency block can be fully used to transmit data with a high throughput rate and a low latency.

Embodiment 5

The following describes in detail a manner of classifying a management frame that carries management information and a control frame that carries control information.

In an implementation provided in this application, the management frame and the control frame may not be classified based on classification attribute values such as a transmission rate, a quality of service, and sending duration. That is, classification may be performed only on a data frame based on the classification attribute values such as the transmission rate, the quality of service, and the sending duration. In this way, functions of all management frames and control frames are not affected.

In another implementation provided in this application, a classification threshold that is of each frequency block and that is set for the data frame may also be used for the management frame, and the control frame may be transmitted in any frequency block.

In still another implementation provided in this application, only some control frames may alternatively be classified according to a special specification. The special specification means that a control frame used to control a second frequency block is sent in a first frequency block, that is, the control frames are classified based on types of the control frames. In an example, it may be set that some or all control frames of a trigger frame, an RTS frame, a CTS frame, a CTS-to-self (CTS-to-Self) frame, an ACK frame, and a BA frame are sent by using the first frequency block.

The following describes an example of a process of sending an important control frame.

In an example, the trigger frame may be used to trigger a STA to transmit uplink data.

Figure 7:
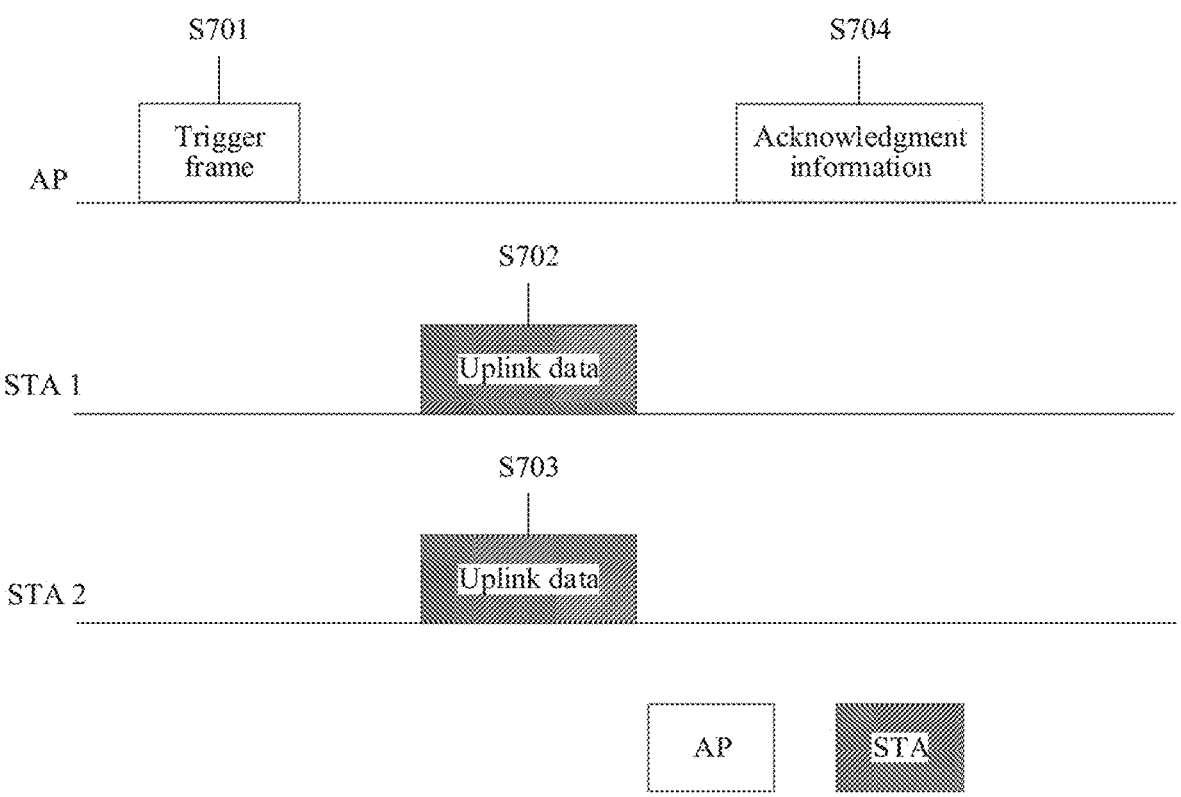
FIG. 7 is a schematic flowchart of triggering, by using a trigger frame, a STA to transmit uplink data.

FIG. 7 is a schematic flowchart of triggering, by using a trigger frame, a STA to transmit uplink data.

As shown in FIG. 7, an interaction process between an AP and a STA 1 and a STA 2 may include the following steps:

S701. The AP sends a trigger frame.
S702. The STA 1 sends uplink data.
S703. The STA 2 sends uplink data.
S704. The AP sends acknowledgment information.

It should be noted that, in the 802.11ax standard, the AP sends the trigger frame, to trigger one or more STAs to transmit the uplink data. As shown in FIG. 7, the AP sends the trigger frame, where the trigger frame carries scheduling information, and provides the STAs with a manner of calibrating and adjusting time, frequency, or power.

If the scheduling information or other similar information in the trigger frame is expected to be transmitted in Band 1, and the STA is scheduled to perform uplink data transmission in Band 2, a synchronization function may not be implemented by using the trigger frame.

To resolve this problem, this application provides the following implementations.

Figure 8:
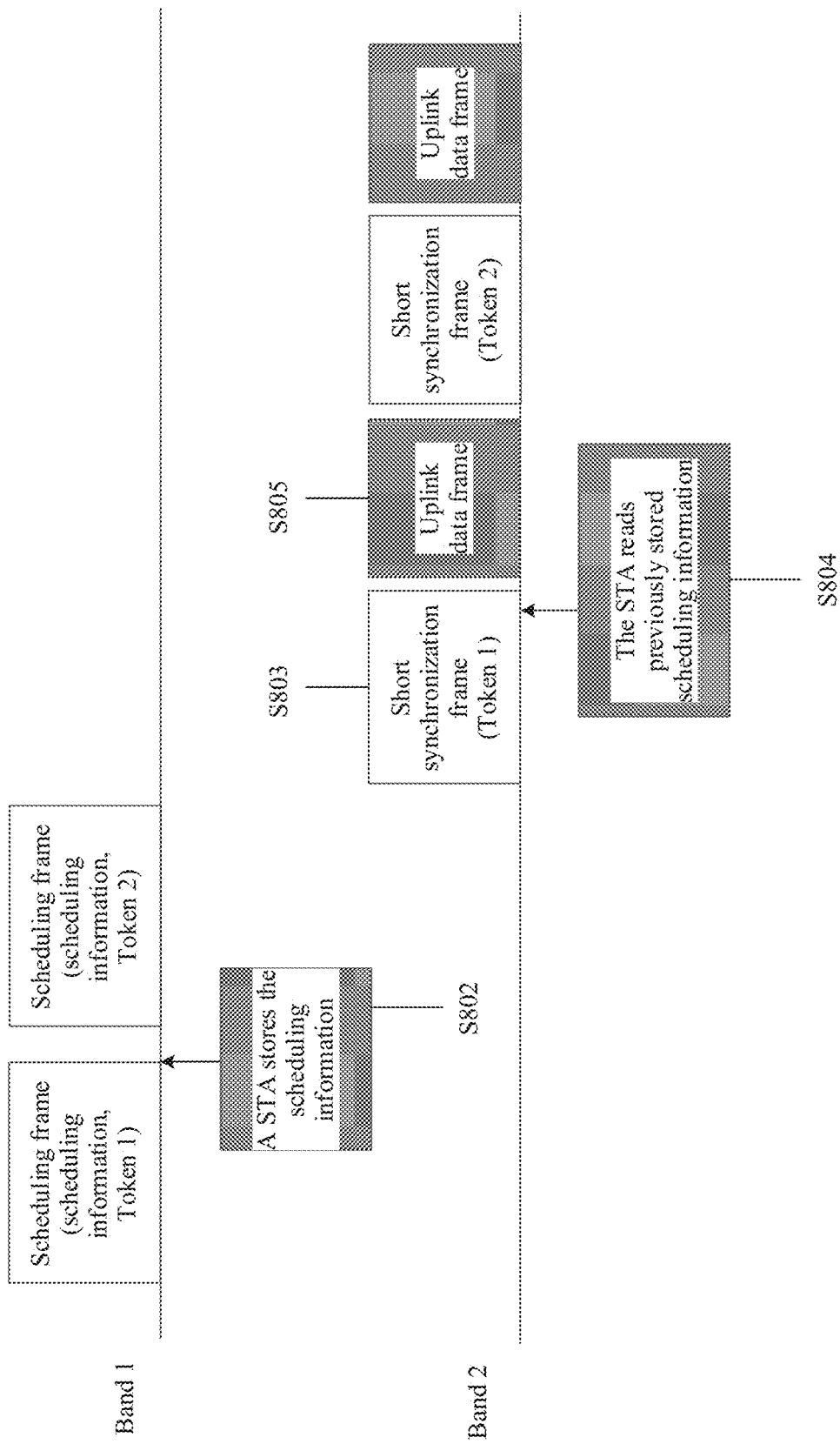
FIG. 8 is a schematic flowchart 2 of a data transmission method according to this application.

FIG. 8 is a schematic flowchart 2 of a data transmission method according to this application.

As shown in FIG. 8, a process of interaction between an AP and a STA may include the following steps:

S801. The AP sends a scheduling frame that carries scheduling information, to a STA in Band 1.

The scheduling frame is used to instruct the STA to transmit data in Band 2 within a target time. The scheduling frame carries a Token token.

S802. The STA receives the scheduling frame in Band 1, and stores the scheduling information.

S803. At the target time, the AP sends a short synchronization frame to the STA in Band 2, to trigger the STA to send uplink data, where the short synchronization frame carries a Token token corresponding to the scheduling frame transmitted in Band 1.

S804. The STA receives the short synchronization frame, and reads previously stored scheduling information based on a token token in the short synchronization frame.

S805. The STA sends an uplink data frame based on the read scheduling information.

In this manner, the scheduling information is transmitted in Band 1, and in Band 2, uplink transmission is triggered by using the short synchronization frame, to implement synchronization. The short synchronization frame can reduce an overhead of Band 2, increase a throughput of Band 2, and reduce a latency of Band 2.

In another example, an RTS/CTS frame may be used to trigger the STA to transmit uplink data.

Figure 9:
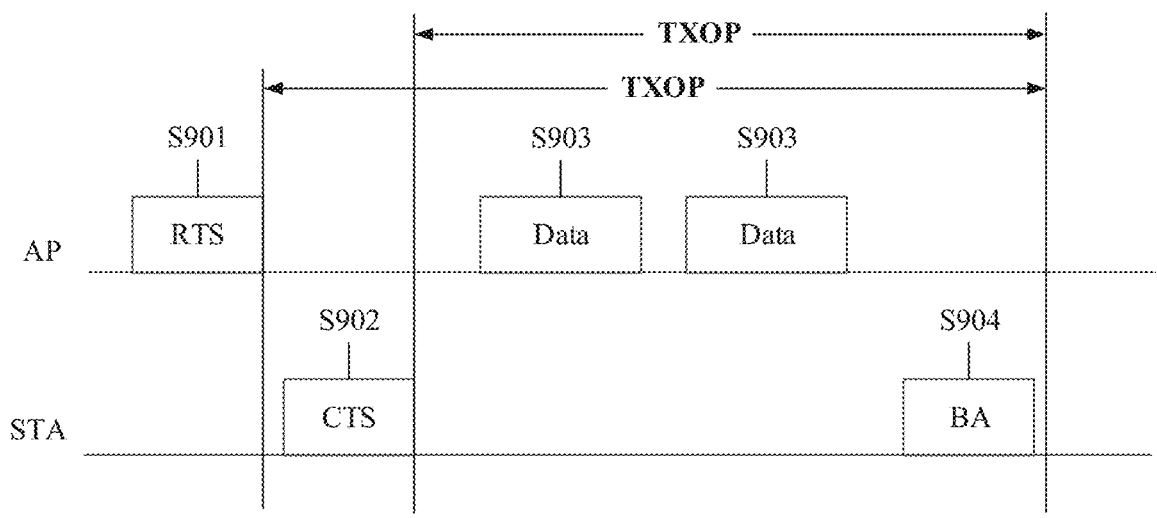
FIG. 9 is a schematic flowchart of performing data transmission by using RTS/CTS.

FIG. 9 is a schematic flowchart of performing data transmission by using RTS/CTS.

As shown in FIG. 9, an interaction process between an AP and a STA 1 and a STA 2 may include the following steps:

S901. The AP sends an RTS frame.

S902. The STA sends an CTS frame.
S903. The AP sends Data.
S904. The STA sends a BA.

It should be noted that the RTS/CTS interaction is to reserve a period of time for data transmission. The AP and the STA that receive the RTS and the CTS keep silent based on corresponding duration information in the RTS and the CTS, so that data transmission performed by a receiving party and a sending party of the RTS/CTS is not interfered. However, if the RTS/CTS is transmitted in Band 1, and data is transmitted in Band 2, surrounding STAs cannot be notified of a transmit opportunity (Transmit Opportunity, TXOP) that the AP and the STA want to reserve, and therefore, data transmission between the AP and the STAs cannot be protected.

To resolve this problem, this application provides the following implementations for dual-band TXOP protection.

Figure 10:
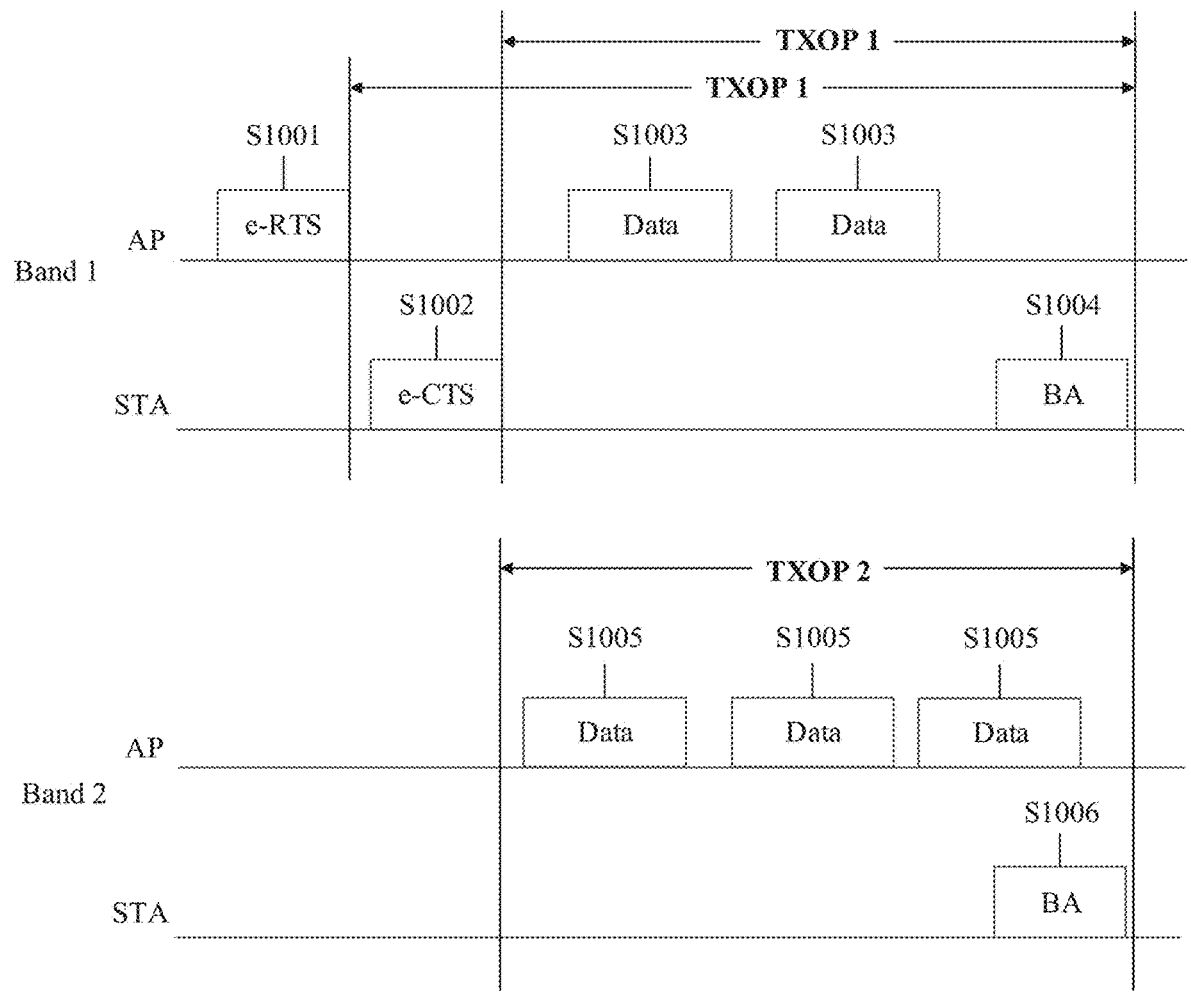
FIG. 10 is a schematic flowchart 3 of a data transmission method according to this application.

FIG. 10 is a schematic flowchart 3 of a data transmission method according to this application.

As shown in FIG. 10, a process of interaction between an AP and a STA may include the following steps:

S1001. The AP sends e-RTS in Band 1.
S1002. The STA sends e-CTS in Band 1.
S1003. The AP sends Data in Band 1.
S1004. The STA sends a BA in Band 1.
S1005. The AP sends the Data in Band 2.
S1006. The STA sends the BA in Band 2.

In this application, "e-" in the e-RTS/e-CTS represents enhanced (enhanced), and is used to represent the RTS/CTS of an enhanced version.

Table 5-1 is a schematic diagram of an e-RTS/e-CTS frame format.

TABLE 5-1

| Frame control | Duration information (of Band 1) | Receiver address | Transmitter address | Duration information of Band 2 | TXOP start time of Band 2 | Site ID/Site group ID | ... | Frame detection control |
|---|---|---|---|---|---|---|---|---|

For interaction between the e-RTS and the e-CTS, the "duration information (of Band 1)" is the same as that in RTS, and is used to reserve a TXOP of Band 1, for example, a TXOP 1; and the "duration information of Band 2" in the e-RTS/e-CTS is used to reserve a TXOP of Band 2, for example, a TXOP 2. The "TXOP start time of Band 2" may be used to reserve the TXOP of Band 2 in Band 1 in advance. However, for an AP and a STA that receives the e-RTS and the e-CTS in Band 1, if the AP or the STA is an AP or a STA identified by the "Site ID/Site group ID", data transmission is performed in a corresponding TXOP indicated in the e-RTS or the e-CTS, if the AP or the STA is not the AP or STA identified by the "Site ID/Site group ID", the AP or the STA keep silent in a corresponding TXOP time indicated in the e-RTS or the e-CTS. A corresponding TXOP time may be obtained through the "duration information of Band 2" field and the "TXOP start time of Band 2" field.

In this manner, this application provides a TXOP protection mechanism for performing dual-band transmission. A TXOP of Band 1 and/or Band 2 is indicated in the e-RTS or an e-CTS, so that a low-rate e-RTS or e-CTS can be transmitted in Band 1. In addition, data transmission in the TXOP of Band 1 and/or Band 2 can be protected.

In still another example, this application provides a classification manner related to an acknowledgment frame. The acknowledgment frame is an important management frame. The acknowledgment frame is used to confirm whether a receive end successfully receives data. In this application, when the data is transmitted in Band 2, a data sender may send an indication to the receive end, to indicate a frequency block in which the acknowledgment frame is expected to be received.

Figure 11:
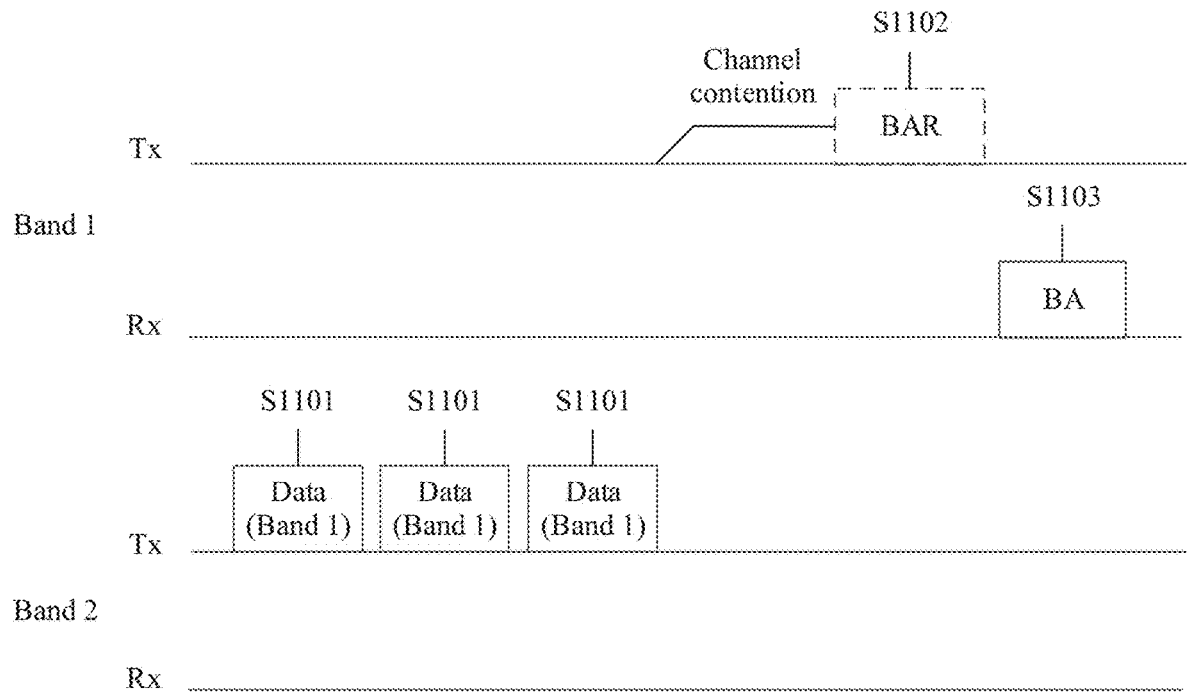
FIG. 11 is a schematic flowchart 4 of a data transmission method according to this application.

FIG. 11 is a schematic flowchart 4 of a data transmission method according to this application.

As shown in FIG. 11, a sender of data may be a first node, and a receive end of the data may be a second node. Steps related to an exchange process of an acknowledgment frame may include the following steps:

S1101. The first node sends Data in Band 2.
S1102. The first node sends a BAR in Band 1.
S1103. The second node sends a BA in Band 1.

When the data sent by the first node is transmitted in Band 2, the second node may be indicated that the first node expects to receive the acknowledgment frame by using Band 1. For example, the Data sent in step S1101 may indicate a frequency block in which the BA is expected to be received.

It should be noted that step S1102 is not a mandatory step.

For example, the second node serving as a receive end may contend for a channel in Band 1 to reply to the BA.

For another example, the second node may wait to reply to the BA in Band 1 after the first node sends a block acknowledgment request (BA Request, BAR) frame. In another implementation provided in this application, the BAR may alternatively use a multi-user block acknowledgment request frame (multi-user block acknowledgment request frame, MU-BAR) as an alternative manner. Both the BAR and the MU-BAR may be used to request an acknowledgment frame from the receive end of the data.

In this embodiment of this application, a method for sending an indication by a transmit end to the receive end may include: indicating, in a sent data frame or a high throughput control (High Throughput Control, HTC) field in a frame header of a management frame, a band ID of a band in which the acknowledgment frame is expected to be returned. This embodiment of this application provides a manner that may be used to send a first frequency block classification range to the second node, where the first frequency block classification range may include a frame whose frame type is the acknowledgment frame, and the acknowledgment frame is used to acknowledge data transmission in the second frequency block.

Table 5-2 is a schematic diagram of a band ID indicated in an HTC field.

TABLE 5-2

| Band ID | Description |
| --- | --- |
| 0 | 2.4 GHz |
| 1 | 4.9 GHz and 5 GHz |
| 2 | 6 GHz |
| 3 | 60 GHz |
| . . . | . . . |

In this manner in which a sender instructs to use a frequency block 1 for acknowledgment when sending data, a resource in a frequency block 2 may be used for high-rate data transmission, to optimize system resource allocation and maximize system efficiency.

In the solution of the present invention, a management frame and an acknowledgment frame with a relatively long air interface occupation time, data with a relatively low rate and a relatively low quality of service priority is transmitted in a first frequency block, and data with a relatively high rate and a relatively high quality of service priority is transmitted in a second frequency block, so that the second frequency block is fully used to perform high-rate data transmission and optimize a system throughput rate, thereby reducing a system latency.

In addition, the 802.11ad standard defines an interface at a low-frequency MAC layer and a high-frequency MAC layer, and the interface is used to transfer content of MAC frames at different layers in a STA. This mechanism is referred to as fast session transfer (Fast Session Transfer, FST). By using respective MAC interfaces, two nodes (for example, a STA 1 and a STA 2) may send a high-frequency MAC frame by using a low-frequency MAC (and a low-frequency PHY) layer. This mechanism is also referred to as an on-channel tunneling (On-Channel Tunneling, OCT) mechanism.

Figure 12:
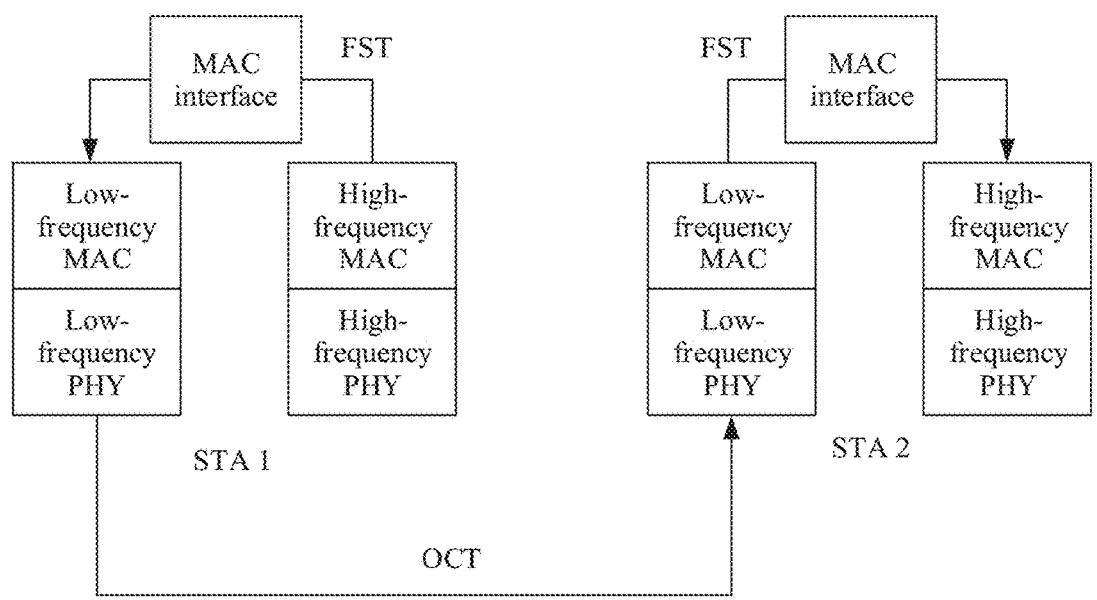
FIG. 12 is a schematic structural diagram of a node.

FIG. 12 is a schematic structural diagram of a node. As shown in FIG. 12, high-frequency MAC data of the STA 1 is transferred to a low-frequency MAC layer of the STA 1 by using an internal MAC interface, and then is encapsulated into a low-frequency data packet at a physical (Physical, PHY) layer and sent to a low-frequency receiver of the STA 2, to obtain a high-frequency MAC frame. In this data transmission manner, single-band transmission may be replaced with multiband transmission, that is, this manner provides a method of sending a MAC frame of a node to another node by using multiple frequency blocks. However, for each frequency block, a high-rate frame and a low-rate frame may be sent in a mixed manner. Consequently, an overall throughput of a frequency block is low and an overall latency of the frequency block is large, which cannot meet requirements of services for the transmission rate or transmission quality.

In the data transmission manner provided in this application, to-be-sent frames are classified based on a classification attribute value, so that an overall throughput rate between nodes can be improved, thereby reducing an average latency between the nodes.

Embodiment 6

Figure 13:
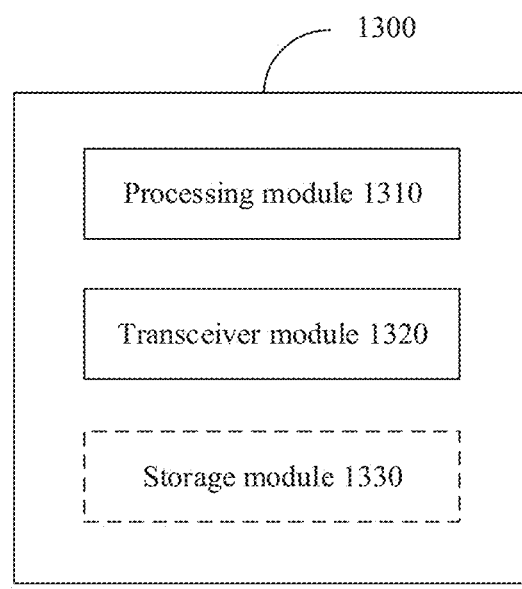
FIG. 13 is a schematic block diagram of a node apparatus 1300 according to an embodiment of this application.

FIG. 13 is a schematic block diagram of a node apparatus 1300 according to an embodiment of this application.

In an embodiment, the apparatus 1300 shown in FIG. 13 may correspond to the apparatus on the first node side in the foregoing method embodiments, and may have any function of the first node in the methods. Optionally, the apparatus 1300 in this embodiment of this application may be the first node, or may be a chip in the first node. The apparatus 1300 may include a processing module 1310 and a transceiver module 1320. Optionally, the apparatus 1300 may further include a storage module 1330.

The processing module 1310 may be configured to perform step S201 in the foregoing method embodiment, or may be configured to perform step S301. In an implementation provided in this application, the processing module 1310 may be further configured to determine, based on a classification attribute value of a to-be-sent frame and a first frequency block classification range, a target frequency block used to send the to-be-sent frame.

The transceiver module 1320 may be configured to perform steps S202 and S203; or configured to perform steps S302, S303, and S304; or configured to perform step S501 or S502.

In this embodiment of this application, the apparatus 1300 may also have any function of the second node in the foregoing methods. For example, the transceiver module 1320 may be configured to perform step S502.

In this embodiment of this application, the first node may be an AR or may be a STA. The first node may perform the steps performed by the AP or the STA that is used as a sender of various to-be-sent frames in the foregoing methods. In addition, the first node may perform the steps performed by the AP or the STA that is used as a receive end of the to-be-sent frame or the second node in the foregoing methods.

In this embodiment of this application, the transceiver module 1320 may be configured to perform step S605, or perform steps S603 and S605, or perform step S606, or perform steps S601, S602, and S606, or perform steps S601, S602, S604 and S606: or perform step S801, or perform steps S802, S803, and S804; or perform steps S1001, S1003, and S1005, or perform steps S1002, S1004, and S1006; or perform steps S1101 and S1102, or perform step S1003.

In this embodiment of this application, the second node may be the AP or the STA It should be understood that the apparatus 1300 in this embodiment of this application may correspond to the first node in the methods in the foregoing embodiments. The foregoing management operations and/or functions that the modules in the apparatus 1300 have, and other management operations and/or functions that the modules have are used to implement corresponding steps of the foregoing methods. For brevity, details are not described herein again.

Alternatively, the apparatus 1300 may be configured as a universal processing system, which is, for example, generally referred to as a chip. The processing module 1310 may include one or more processors that provide a processing function. The transceiver module 1320 may be, for example, an input/output interface, a pin, or a circuit. The input/output interface may be configured to be responsible for information interaction between the chip system and the outside. For example, the input/output interface may output a scheduling request message input by another module outside the chip for processing. The processing module may execute a computer-executable instruction stored in the storage module, to implement the functions of the first node in the foregoing method embodiments. In an example, the storage module 1330 optionally included in the apparatus 1300 may be a storage unit inside the chip, for example, a register or a cache, or the storage module 1330 may be a storage unit outside the chip, for example, a read-only memory (read-only memory. ROM for short), another type of static storage device that can store static information and instructions, or a random access memory (random access memory, RAM for short).

Figure 14:
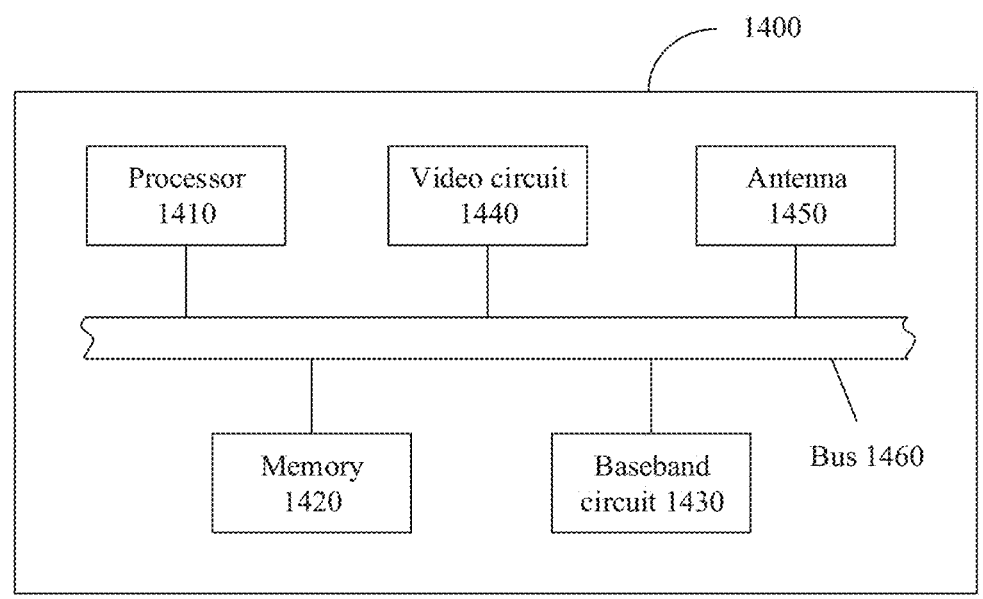
FIG. 14 is a schematic block diagram of another communications apparatus 1400 on a node side according to an embodiment of this application.

In another example, FIG. 14 is a schematic block diagram of another communications apparatus 1400 on a node side according to an embodiment of this application. The apparatus 1400 in this embodiment of this application may be the first node in the foregoing method embodiments, and the apparatus 1400 may be configured to implement some or all of the functions of the first node in the foregoing method embodiments. The apparatus 1400 may include a processor 1410, a baseband circuit 1430, a radio frequency circuit 1440, and an antenna 1450. Optionally, the apparatus 1400 may further include a memory 1420. All the components of the apparatus 1400 are coupled together by using a bus 1460. The bus system 1460 includes a data bus, and further includes a power bus, a control bus, and a status signal bus. However, for clear description, the buses are all marked as the bus system 1460 in the figure.

The processor 1410 may be configured to control the first node, and is configured to perform the processing performed by the first node in the foregoing embodiments. The processor 1410 may perform the processing process related to the first node in the foregoing method embodiments and/or other processes of the technology described in this application, and may further run an operating system. The processor 1410 is responsible for managing the bus, and may execute a program or an instruction stored in the memory.

The baseband circuit 1430, the radio frequency circuit 1440, and the antenna 1450 may be configured to support information receiving and sending between the first node and the second node in the foregoing embodiments, to support wireless communication between the first node and another node. The second node may be an AP or a STA.

In an example, a to-be-sent frame that is sent by the second node and that is encapsulated by a PHY layer is received by using the antenna 1450. After processing such as filtering, amplification, down-conversion, and digitization is performed by the radio frequency circuit 1440, and baseband processing such as decoding and protocol-based data decapsulation is performed by the baseband circuit 1430 on the to-be-sent frame, the processor 1410 performs processing to recover service data and signaling information that are carried in the to-be-sent frame sent by the second node. In still another example, a to-be-sent frame that is sent by the first node and that carries service data and signaling information may be processed by the processor 1410; and then after baseband processing such as protocol-based encapsulation and coding is performed by the baseband circuit 1430, and radio frequency processing such as analog conversion, filtering, amplification, and up-conversion is further performed by the radio frequency circuit 1440 on the to-be-sent frame, the to-be-sent frame is sent to the second node by using the antenna 1450.

The memory 1420 may be configured to store program code and data of the first node, and the memory 1420 may be the storage module 1330 in FIG. 13. It may be understood that the baseband circuit 1430, the radio frequency circuit 1440, and the antenna 1450 may be further configured to support communication between a second access point and another network entity, for example, communication between the second access point and a network element on a core network side. As shown in FIG. 14, the memory 1420 is separated from the processor 1410. However, a person skilled in the art very easily understands that the memory 1420 or any part of the memory 1420 may be located outside the apparatus 1400. For example, the memory 1420 may include a transmission line and/or a computer product separated from a wireless node. These media can be accessed by the processor 1410 by using the bus interface 1460. Alternatively, the memory 1420 or any part of the memory 1420 may be integrated into the processor 1410, for example, may be a cache and/or a general-purpose register.

It may be understood that FIG. 14 shows only a simplified design of the first node. For example, in actual application, the first node may include any quantity of transmitters, receivers, processors, memories, and the like, and all first nodes that can implement the present invention fall within the protection scope of the present invention.

It should be noted that, when the apparatus 1400 is used as a receive end, the apparatus 1400 may be further configured to perform some or all functions of the second node in the foregoing method embodiments. In addition, the apparatus 1400 may be further configured to perform some or all functions of the AP or the STA in the foregoing method embodiments.

An embodiment of this application further provides a computer storage medium. The computer-readable storage medium stores an instruction, where the instruction may be executed by one or more processors in a processing circuit. When the instruction is run on a computer, the computer is enabled to perform the methods in the foregoing aspects.

An embodiment of this application further provides a chip system. The chip system includes a processor, configured to support the first node or the second node in implementing the functions in the foregoing embodiments, for example, generating or processing data and/or information in the foregoing methods.

In a possible design, the chip system may further include a memory. The memory is configured to store a program instruction and data that are necessary for the first node or the second node. The chip system may include a chip, or may include a chip and another discrete device.

An embodiment of this application further provides a processor, configured to be coupled to a memory. The processor is configured to perform the method and the function of the first node in any one of the foregoing embodiments.

An embodiment of this application further provides a processor, configured to be coupled to a memory. The processor is configured to perform the method and the function of the second node in any one of the foregoing embodiments.

An embodiment of this application further provides a computer program product including an instruction. When the computer program product runs on a computer, the computer is enabled to perform the method and function related to the first node in any one of the foregoing embodiments.

An embodiment of this application further provides a computer program product including an instruction. When the computer program product runs on a computer, the computer is enabled to perform the method and function related to the second node in any one of the foregoing embodiments.

An embodiment of this application further provides a wireless communications system. The system includes the first node and at least one second node in the foregoing embodiments.

All or some of the foregoing embodiments may be implemented by software, hardware, firmware, or any combination thereof. When software is used to implement the embodiments, the embodiments may be implemented or partially in a form of a computer program product. The computer program product includes one or more computer instructions. When the computer program instructions are loaded and executed on a computer, the procedure or functions according to this application are all or partially generated. The computer may be a general-purpose computer, a special-purpose computer, a computer network, or another programmable apparatus. The computer instructions may be stored in a computer-readable storage medium or may be transmitted from one computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive), or the like.

What is claimed is:

1. A data transmission method, wherein the method comprises:
    sending, by a communication apparatus, a probe request frame on a first frequency band, wherein the probe request frame includes capability information of the communication apparatus in the first frequency band and capability information of the communication apparatus in a second frequency band, and the second frequency band is higher than the first frequency band on frequency;
    receiving, by the communication apparatus, a probe response frame on the first frequency band;
    sending, by the communication apparatus, an association request frame on the first frequency band, wherein the association request frame is used to request an association in the first frequency band and the second frequency band;
    receiving, by the communication apparatus, an association response frame on the first frequency band, wherein the association response frame is used to indicate the communication apparatus to establish the association in the first frequency band and the second frequency band;
    obtaining, by the communication apparatus, a frame; and
    sending, by the communication apparatus, the frame on the first frequency band but not the second frequency band, when a transmission rate of the frame is less than a preset transmission rate classification threshold; or
    sending, by the communication apparatus, the frame on the first frequency band or the second frequency band, when the transmission rate of the frame is greater than the preset transmission rate classification threshold.

2. The method according to claim 1, wherein the second frequency band is 6 GHz frequency band.

3. The method according to claim 1, wherein the first frequency band is 2.4 GHz frequency band or 5 GHz frequency band.

4. The method according to claim 1, wherein the first frequency band is 2.4 GHz frequency band, and the second frequency band is 5 GHz frequency band.

5. The method according to claim 1, wherein the preset transmission rate classification threshold is set for a spatial stream.

6. The method according to claim 1, wherein the preset transmission rate classification threshold is indicated.

7. The method according to claim 1, wherein a packet format of the frame is a high efficient (HE) data packet.

8. A data transmission apparatus wherein the apparatus comprises a non-transitory memory storage comprising instructions; and
    one or more processors in communication with the memory, wherein the one or more processors execute the instructions to:
        send a probe request frame on a first frequency band, wherein the probe request frame includes capability information of the apparatus in the first frequency band and capability information of the apparatus in a second frequency band, and the second frequency band is higher than the first frequency band on frequency;

receive a probe response frame on the first frequency band;

send an association request frame on the first frequency band, wherein the association request frame is used to request an association in the first frequency band and the second frequency band;

receive an association response frame on the first frequency band, wherein the association response frame is used to indicate the apparatus to establish the association in the first frequency band and the second frequency band;

obtain a frame; and send the frame on the first frequency band but not the second frequency band, when a transmission rate of the frame is less than a preset transmission rate classification threshold; or send the frame on the first frequency band or the second frequency band, when the transmission rate of the frame is greater than the preset transmission rate classification threshold.

9. The data transmission apparatus according to claim 8, wherein the second frequency band is 6 GHz frequency band.

10. The data transmission apparatus according to claim 8, wherein the first frequency band is 2.4 GHz frequency band or 5 GHz frequency band.

11. The data transmission apparatus according to claim 8, wherein the first frequency band is 2.4 GHz frequency band, and the second frequency band is 5 GHz frequency band.

12. The data transmission apparatus according to claim 8, wherein the preset transmission rate classification threshold is set based on a spatial stream.

13. The data transmission apparatus according to claim 8, wherein the preset transmission rate classification threshold is indicated.

14. The data transmission apparatus according to claim 8, wherein a packet format of the frame is a high efficient (HE) data packet.

15. A non-transitory computer-readable media storing computer instructions, that when executed by one or more processors of a communication apparatus, cause the one or more processors to:

send a probe request frame on a first frequency band, wherein the probe request frame includes capability information of the communication apparatus in the first frequency band and capability information of the communication apparatus in a second frequency band, and the second frequency band is higher than the first frequency band on frequency;

receive a probe response frame on the first frequency band;

send an association request frame on the first frequency band, wherein the association request frame is used to request an association in the first frequency band and the second frequency band;

receive an association response frame on the first frequency band, wherein the association response frame is used to indicate the communication apparatus to establish the association in the first frequency band and the second frequency band;

obtain a frame; and send the frame on the first frequency band but not the second frequency band, when a transmission rate of the frame is less than a preset transmission rate classification threshold; or send the frame on the first frequency band or the second frequency band, when the transmission rate of the frame is greater than the preset transmission rate classification threshold.

16. The non-transitory computer-readable media according to claim 15, wherein the second frequency band is 6 GHz frequency band.

17. The non-transitory computer-readable media according to claim 15, wherein the first frequency band is 2.4 GHz frequency band or 5 GHz frequency band.

18. The non-transitory computer-readable media according to claim 15, wherein the first frequency band is 2.4 GHz frequency band, and the second frequency band is 5 GHz frequency band.

19. The non-transitory computer-readable media according to claim 15, wherein the preset transmission rate classification threshold is set based on a spatial stream.

20. The non-transitory computer-readable media according to claim 15, wherein the preset transmission rate classification threshold is indicated.

* * * * *